United States Patent
Gallucci et al.

(10) Patent No.: US 9,255,181 B2
(45) Date of Patent: Feb. 9, 2016

(54) SOLVENTLESS PROCESS FOR THE PREPARATION OF AMINE FUNCTIONAL POLYETHERIMIDE RESINS WITH IMPROVED MELT FLOW

(71) Applicant: SABIC INNOVATIVE PLASTICS IP B.V., Bergen Op Zoom (NE)

(72) Inventors: Robert R. Gallucci, Mt. Vernon, IN (US); Roy Odle, Mt. Vernon, IN (US); Daniel F. Lowery, Mt. Vernon, IN (US); Richard Peters, Hinsdale, MA (US)

(73) Assignee: SABIC GLOBAL TECHNOLOGIES B.V., Bergen Op Zoom (NL)

(*) Notice: Subject to any disclaimer, the term of this patent is extended or adjusted under 35 U.S.C. 154(b) by 0 days.

(21) Appl. No.: 14/227,470

(22) Filed: Mar. 27, 2014

(65) Prior Publication Data

US 2014/0213739 A1    Jul. 31, 2014

Related U.S. Application Data

(62) Division of application No. 13/286,093, filed on Oct. 31, 2011, now Pat. No. 8,722,187.

(51) Int. Cl.
| | |
|---|---|
| *C08L 79/08* | (2006.01) |
| *C08G 73/10* | (2006.01) |
| *D04H 1/4326* | (2012.01) |
| *D01F 6/74* | (2006.01) |
| *D01F 6/78* | (2006.01) |
| *D01D 5/08* | (2006.01) |
| *C08G 75/23* | (2006.01) |
| *C08G 77/382* | (2006.01) |

(52) U.S. Cl.
CPC ............ *C08G 73/1071* (2013.01); *C08G 73/10* (2013.01); *C08G 73/106* (2013.01); *C08G 73/1017* (2013.01); *C08G 73/1028* (2013.01); *C08G 73/1046* (2013.01); *C08G 73/1053* (2013.01); *C08G 73/1064* (2013.01); *C08G 75/23* (2013.01); *C08G 77/382* (2013.01); *D01D 5/08* (2013.01); *D01F 6/74* (2013.01); *D01F 6/78* (2013.01); *D04H 1/4326* (2013.01); *C08L 79/08* (2013.01); *Y10T 428/249921* (2015.04); *Y10T 428/2933* (2015.01); *Y10T 428/2969* (2015.01)

(58) Field of Classification Search
None
See application file for complete search history.

(56) References Cited

U.S. PATENT DOCUMENTS

| | | | | |
|---|---|---|---|---|
| 4,293,684 | A | * | 10/1981 | Takekoshi ............. 528/185 |
| 4,405,770 | A | | 9/1983 | Schoenberg et al. |
| 4,650,824 | A | | 3/1987 | Clikeman et al. |
| 4,981,497 | A | * | 1/1991 | Hayes ...................... 95/51 |
| 5,438,114 | A | * | 8/1995 | White et al. ............ 528/322 |
| 2004/0260055 | A1 | | 12/2004 | Gallucci et al. |
| 2006/0009613 | A1 | * | 1/2006 | Gallucci et al. ........ 528/310 |
| 2006/0094852 | A1 | | 5/2006 | Yuan et al. |

FOREIGN PATENT DOCUMENTS

EP    0442653 A2    8/1991

* cited by examiner

*Primary Examiner* — Ana Woodward
(74) *Attorney, Agent, or Firm* — Novak Druce Connolly Bove + Quigg LLP

(57) ABSTRACT

The disclosure relates to a process that includes blending a polyimide resin and a primary alky amine organic compound to produce an aryl amine functionalized polyimide, having aryl amine functionality in excess of any anhydride functionality. The polyimide resin can have a weight average molecular weight (Mw) from 5,000 to 100,000 daltons. The organic compound can include at least one primary aliphatic amine without a direct linkage of a nitrogen to an aryl group and without a functionality selected from a halogen functionality, a hydroxyl functionality, a sulfonic acid functionality, a sulfonic acid salt functionality, and combinations thereof. The disclosure also relates to alkyl imide functionalized polyimides also with aryl amine functionalized polyimides, having aryl amine functionality in excess of any anhydride functionality and articles produced therefrom.

21 Claims, No Drawings

SOLVENTLESS PROCESS FOR THE PREPARATION OF AMINE FUNCTIONAL POLYETHERIMIDE RESINS WITH IMPROVED MELT FLOW

CROSS REFERENCE TO RELATED APPLICATIONS

This application is a divisional of U.S. application Ser. No. 13/286,093, having been filed Oct. 31, 2011, herein incorporated by reference in its entirety.

BACKGROUND OF THE INVENTION

Polyetherimides (PEI) are well known engineering thermoplastics that can be made by condensation polymerization. For example, see: ASTM: D5205 Standard Classification System for Polyetherimide Materials. Due to their high glass, transition temperature (Tg) and relatively stiff backbones, polyetherimides can be difficult to melt process.

BRIEF SUMMARY OF THE INVENTION

Various embodiments of the invention provide a combination of a primary aliphatic amine with an aryl polyimide in a melt, which provides aryl amine functionalized resins with improved flow. More specifically, it has been found that reaction of an aryl PEI with primary aliphatic amine by a melt process can give aryl amine functionalized resins with improved flow while at the same time functionalizing the higher flow aryl polyimide with both alkyl imide and aryl amine functional end groups.

In one embodiment, our invention relates to a process comprising reacting a polyimide resin and an organic compound to produce an aryl amine functionalized polyimide, having aryl amine functionality in excess of any anhydride functionality, wherein the polyimide resin has a weight average molecular weight (Mw) from 5,000 to 100,000 daltons, wherein the organic compound comprises at least one primary aliphatic amine, wherein the primary aliphatic amine does not have a direct linkage of a nitrogen to an aryl group, and wherein the primary aliphatic amine does not have a functionality selected from the group consisting of a halogen functionality, a hydroxyl functionality, a sulfonic acid functionality, a sulfonic acid salt functionality, and combinations thereof.

In another embodiment, our invention relates to a process for making a fiber where the above-mentioned process further involves continuously producing a fiber having a denier in a range of from greater than 0 to 10 denier at a rate of from 0.5 to 10 kg/hour. In another embodiment, our invention relates to a fiber made by the process.

In another embodiment, our invention relates to fabrics made from the fibers made by our process.

In another embodiment, our invention relates to an aryl amine functionalized polyimide, having aryl amine functionality in excess of any anhydride functionality.

In another embodiment, our invention relates to an article comprising an alkyl imide functionalized polyimide, further having an aryl amine functionality in excess of any anhydride functionality.

According to various embodiments, the primary aliphatic amine can be a primary aliphatic amine thermally stable at polyimide melt processing temperatures, above about 300° C. An exemplary amine is a $C_6$-$C_{20}$ alkyl amine, such as stearyl amine. The primary aliphatic amine can be combined in the melt with polyimide resins at from 0.01 to 5 wt, % of the mixture, or at from 0.1 to 1.0 wt, % of the mixture.

According to various embodiments, polyimide can be readily reacted with the primary aliphatic amine a melt reaction, such as extrusion, by combining the ingredients and melting and mixing in devices such as an extruder. Without wishing to be bound by theory, it is thought that the primary aliphatic amine chemically combines with the polyimide to make a new resin that is end capped with the residue of the alkyl amine reacting through the primary amino functionality to produce an alkylamide polymer end, group. At the same time, this coverts the existing aryl imide group into an aryl amine functionality a shown in Equation 1 for the reaction of octadecyl amine to example of a primary alkyl amine) with a polyetherimide derived from bisphenol A dianhydride and m-phenylene diamine.

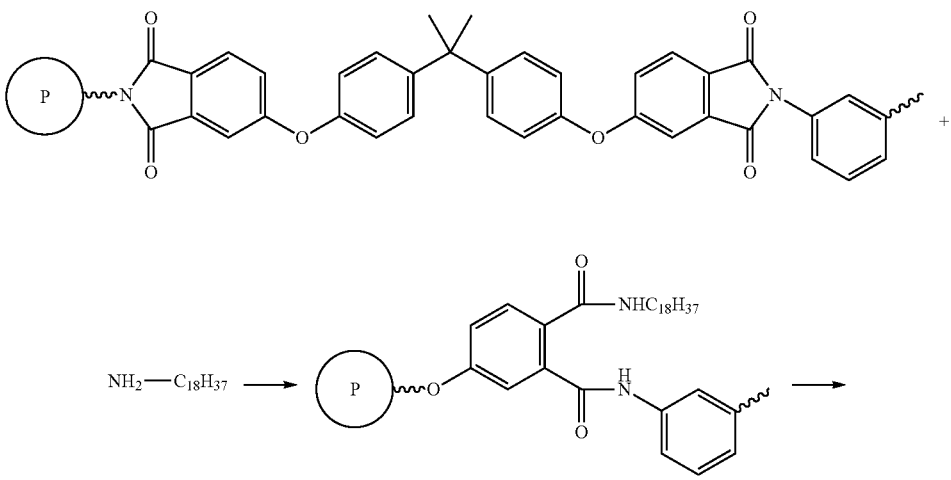

Equation 1

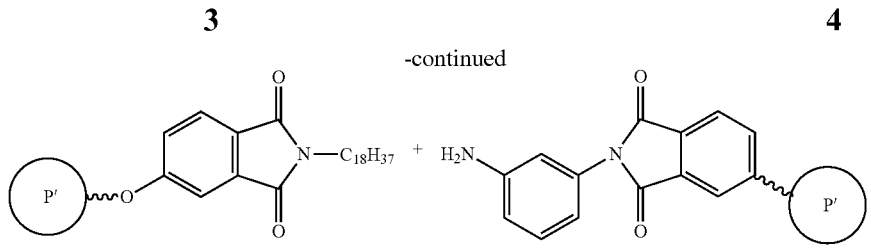

The primary aliphatic amine can be introduced into a molten stream of polyimide resin, for instance, by feeding downstream from the primary feed throat of an extruder or the primary aliphatic amine can be fed into an extruder at the same time as the polyimide. In some instances the reaction can be accomplished in under a minute with no use of solvent.

Various embodiments relate to a process that includes thermally reacting a polyimide resin and a primary aliphatic amine organic compound to produce an alkyl imide and aryl amine functionalized polyimide, having aryl amine functionality in excess of any anhydride functionality. The unmodified (starting) polyimide resin can have a weight average molecular weight (Mw) from 5,000 to 100,000 daltons. The organic compound can include at least one primary aliphatic amine without a direct linkage of a nitrogen to an aryl group and without a functionality selected from a halogen functionality, a hydroxyl functionality, a sulfonic acid functionality, a sulfonic acid salt functionality, and combinations thereof.

Other embodiments relate to aryl amine functionalized polyimides, having alkyl imide and aryl amine functionality in excess of any anhydride functionality and articles produced therefrom.

These and other features, aspects, and advantages of the present invention will become better understood with reference to the following description and appended claims.

DETAILED DESCRIPTION OF THE INVENTION

Our invention is based, in part, on the discovery that by using aryl/aryl imide terminated polyamides, e.g., PEI, the use of such PEI exhibits, unexpectedly and remarkably, relatively higher flow and melt stability properties, as compared to a polyetherimide that is not aryl-amine and octadecyl imide terminated. Advantageously, the properties of our composition when used to make fibers, makes it possible to make fibers with a combination of useful properties and makes it possible to spin fibers having low denier features for extended periods of time.

The present invention may be understood more readily by reference to the following detailed description of preferred embodiments of the invention as well as to the examples included therein.

All numeric values are herein assumed to be modified by the term "about," whether or not explicitly indicated. The term "about" generally refers to a range of numbers that one of skill in the art would consider equivalent to the recited value (i.e., having the same function or result). In many instances, the term "about" may include numbers that are rounded to the nearest significant figure.

Various embodiments relate to a process comprising blending a polyamide resin and a primary aliphatic amine organic compound to produce an aryl amine functionalized polyimide, having aryl amine functionality in excess of any anhydride functionality as well as containing alky imide end groups.

The blending can occur in an extruder operated at atmospheric pressure with no vacuum applied.

The blending can occur in an extruder operated at a rotational speed within a range having a lower limit and/or an upper limit. The range can include or exclude the lower limit and/or the upper limit. The lower limit and/or upper limit can be selected from 10, 20, 30, 40, 50, 60, 70, 80, 90, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, 500, 510, 520, 530, 540, 550, 560, 570, 580, 590, 600, 610, 620, 630, 640, 650, 660, 670, 680, 690, 700, 710, 720, 730, 740, and 750 ppm. For example, the blending can occur in an extruder operated at 50 to 500 rpm.

The blending and/or reaction can occur in the molten polyimide at a temperature within a range having a lower limit and/or an upper limit. The range can include or exclude the lower limit and/or the upper limit. The lower limit and/or upper limit can be selected from 200, 210, 220, 230, 240, 250, 260, 270, 280, 290, 300, 310, 320, 330, 340, 350, 360, 370, 380, 390 and 400 degrees Celsius. A temperature that allows for melting or the polyetherimide while optimizing retention of the aliphatic primary amine in the extruder is preferred, for example, a melt reaction can occur at a temperature of from 300 to 370 degrees Celsius.

The extruder can be of any conventional type, for example either single or twin screw with any screw design. In a preferred embodiment the extruder is a co-rotating twin screw extruder that is run at atmospheric pressure with no external vacuum applied. In some instances the extruder will have a length to diameter (L/D) of from 5:1 to 50:1. In other instances the L/D will be from 20:1 to 40:1. In yet other instances the extruder screw diameter will vary from 0.5 to 8.0 inches. The extruder can be run at any conventional speed, for example from 50 to 400 revolutions per minute (rpm). The initial polyetherimide (PEI) can be fed to the extruder in any form, for example, pellets, cubes, flakes, chunks, powder or any mixture thereof. The primary alkyl amine may be mixed with the unmelted polyimide and the mixture fed into the throat of the extruder or the primary alkyl amine may be added down stream of the feed throat into a molten polyimide.

The blending and/or reaction can occur with little or no organic solvent in an amount within a range having a lower limit and/or an upper limit. The range of organic solvent, if present, can include or exclude the lower limit and/or the upper limit. The lower limit and/or upper limit can be selected from 0, 100, 125, 150, 175, 200, 225, 250, 275, 300, 325, 350, 375, 400, 425, 450, 475, 500, 525, 550, 575, 600, 625, 650, 675, 700, 725, 750, 775, 800, 825, 850, 875, 900, 925, 950, 975, and 1000 ppm. For example, the blending can occur in the presence of less than 500 ppm of an organic solvent.

The process can further comprise continuously producing a fiber having a denier within a range having a lower limit and/or an upper limit. The range can include or exclude the lower limit and/or the upper limit. The lower limit and/or upper limit can be selected from 0.1, 0.5, 1, 1.5, 2, 2.5, 3, 3.5, 4, 4.5, 5, 5.5, 6, 6.5, 7, 7.5, 8, 8.5, 9, 9.5, 10, 10.5, 11, 11.5, 12, 12.5, 13, 13.5, 14, 14.5, 15, 15.5, 16, 16.5, 17, 17.5, 18, 18.5, 19, 19.5, and 20 denier. The fiber can be produced at any rate, as long as the fiber has useful denier features. In one embodiment, the rate is within a range having a lower limit and/or an upper limit. The range can include or exclude the lower limit and/or the upper limit. The lower limit and/or upper limit can be selected from 1, 1.5, 2, 2.5, 3, 3.5, 4, 4.5, 5, 5.5, 6, 6.5, 7, 7.5, 8, 8.5, 9, 9.5, 10, 10.5, 11, 11.5, 12, 12.5, 13, 13.5, 14, 14.5, 15, 15.5, 16, 16.5, 17, 17.5, 18, 18.5, 19, 20, 30, 40, 50, 60, 60, 80, 80, 100, 150 and 200 kg/hour. For example, the process can further comprise continuously producing a fiber having a denier in a range of from greater than 0 to 10 denier at a rate of from 0.5 or from 5 to 100 kg/hour. Various embodiments relate to a fiber made by such a process.

The polyamide can be selected from (i) polyetherimide homopolymers, e.g., polyetherimides, (ii) polyetherimide copolymers, e.g., siloxane-polyetherimides, polyetherimide sulfones, and (iii) combinations thereof. Polyimides are known polymers and are sold by SABIC Innovative Plastics under the Ultem*, Extem*, and Siltem* brands (Trademark of SABIC Innovative Plastics IP B.V.).

The polyetherimides are of formula (1):

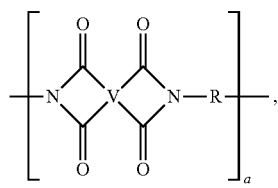
(1)

wherein a is more than 1, for example 10 to 1,000 or more, or more specifically 10 to 500.

The group V in formula (1) is a tetravalent linker containing an ether group (a "polyetherimide" as used herein) or a combination of an ether groups and arylene sulfone groups (a "polyetherimide sulfone"). Such linkers include but are not limited to (a) substituted or unsubstituted, saturated, unsaturated or aromatic monocyclic and polycyclic groups having 5 to 50 carbon atoms, optionally substituted with ether groups, arylene sulfone groups, or a combination of ether groups and arylene sulfone groups; and (b) substituted or unsubstituted, linear or branched, saturated or unsaturated alkyl groups having 1 to 30 carbon atoms and optionally substituted with ether groups or a combination of ether groups, arylene sulfone groups, and arylene sulfone groups; or combinations comprising at least one of the foregoing. Suitable additional substitutions include, but are not limited to, ethers, amides, esters, and combinations comprising at least one of the foregoing.

The R group in formula (1) includes but is not limited to substituted or unsubstituted divalent organic groups such as: (a) aromatic hydrocarbon groups having 6 to 20 carbon atoms and halogenated derivatives thereof; (b) straight or branched chain alkylene groups having 2 to 20 carbon atoms; (c) cycloalkylene groups having 3 to 20 carbon atoms, or (d) divalent groups of formula (2):

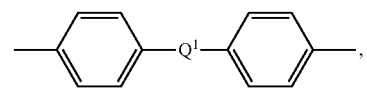
(2)

wherein $Q^1$ includes but is not limited to a divalent moiety such as —O—, —S—, —C(O)—, —SO$_2$—, —SO—, —C$_y$H$_{2y}$— (y being an integer from 1 to 5), and halogenated derivatives thereof, including perfluoroalkylene groups.

In an embodiment, linkers V include but are not limited to tetravalent aromatic groups of formula (3):

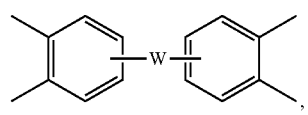
(3)

wherein W is a divalent moiety including —O—, —SO$_2$—, or a group of the formula —O—Z—O— wherein the divalent bonds of the —O— or the —O—Z—O— group are in the 3,3', 3,4', 4,3', or the 4,4' positions, and wherein Z includes, but is not limited to divalent groups of formulas (4):

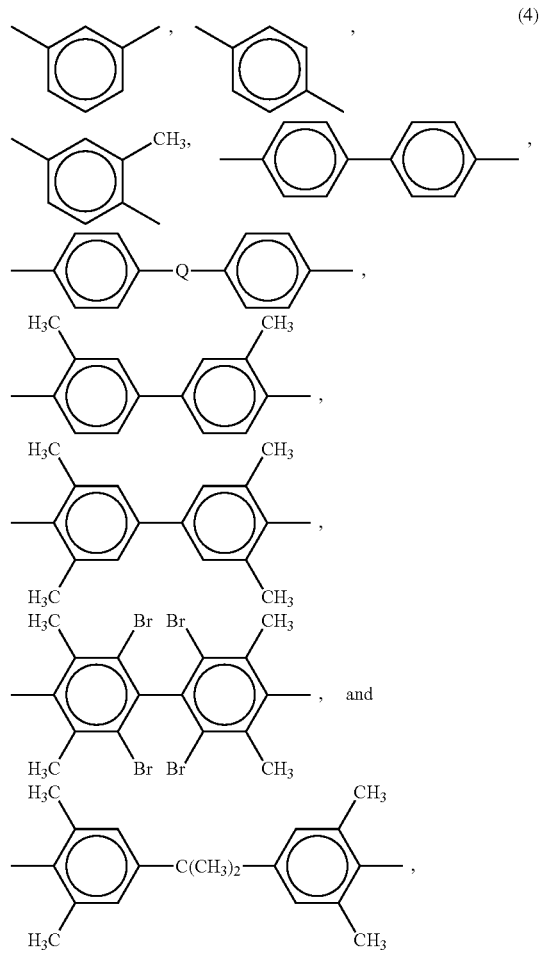
(4)

wherein Q includes, but is not limited to a divalent moiety including —O—, —S—, C(O)—, —SO$_2$—, —SO—, —$C_yH_{2y}$— (y being an integer from 1 to 5), and halogenated derivatives thereof, including perfluoroalkylene groups.

In a specific embodiment, the polyetherimide comprise more than 1, specifically 10 to 1,000, or more specifically, 10 to 500 structural units, of formula (5):

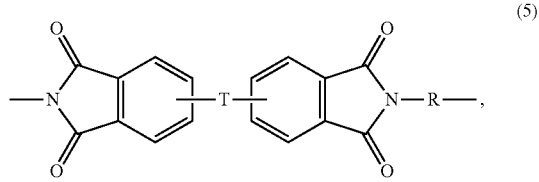

(5)

wherein T is —O— or a group of the formula —O—Z—O— wherein the divalent bonds of the —O— or the —O—Z—O— group are in the 3,3', 3,4', 4,3', or the 4,4' positions; Z is a divalent group of formula (3) as defined above; and R is a divalent group of formula (2) as defined above.

In another specific embodiment, the polyetherimide sulfones are polyimides comprising ether groups and sulfone groups wherein at least 50 mole % of the linkers V and the groups R in formula (1) comprise a divalent arylene sulfone group. For example, all linkers V, but no groups R, can contain an arylene sulfone group; or all groups R but no linkers V can contain an arylene sulfone group; or an arylene sulfone can be present in some fraction of the linkers V and R groups, provided that the total mole fraction of V and R groups containing an aryl sulfone group is greater than or equal to 50 mole %.

Even more specifically, polyetherimide sulfones can comprise more than 1, specifically 10 to 1,000, or more specifically, 10 to 500 structural units of formula (6):

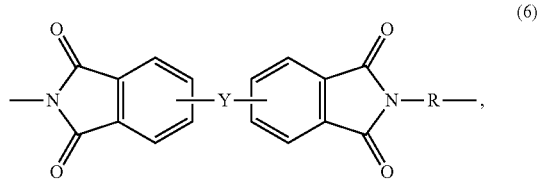

(6)

wherein Y is —O—, —$SO_2$—, or a group of the formula —O—Z—O— wherein the divalent bonds of the —O—, $SO_2$—, or the —O—Z—O— group are in the 3,3', 3,4', 4,3', or the 4,4' positions, wherein Z is a divalent group of formula (3) as defined above and R is a divalent group of formula (2) as defined above, provided that greater than 50 mole % of the sum of moles Y+moles R in formula (2) contain —$SO_2$— groups.

It is to be understood that the polyetherimides and polyetherimide sulfones can optionally comprise linkers V that do not contain ether or ether and sulfone groups, for example linkers of formula (7):

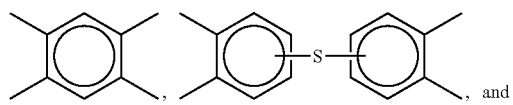

(7)

, and

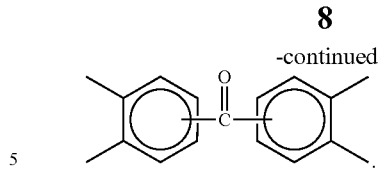

Imide units containing such linkers are generally be present in amounts ranging from 0 to 10 mole % of the total number of units, specifically 0 to 5 mole %. In one embodiment no additional linkers V are present in the polyetherimides and polyetherimide sulfones.

In another specific embodiment, the polyetherimide comprises 10 to 500 structural units of formula (5) and the polyetherimide sulfone contains 10 to 500 structural units of formula (6).

The polyetherimide and polyetherimide sulfones can be prepared by various methods, including, but not limited to, the reaction of a bis(phthalimide) for formula (8):

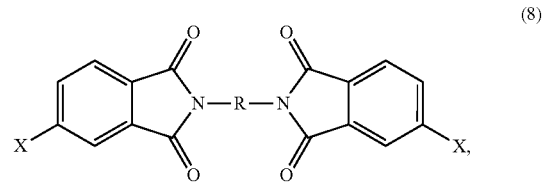

(8)

wherein R is as described above and X is a nitro group or a halogen. Bis-phthalimides (8) can be formed, for example, by the condensation of the corresponding anhydride of formula (9):

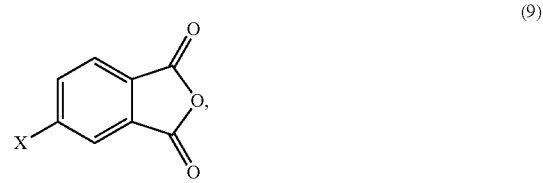

(9)

wherein X is a nitro group or halogen, with an organic diamine of the formula (10):

$H_2N$—R—$NH_2$ (10), wherein R is as described above.

Illustrative examples of amine compounds of formula (10), include: ethylenediamine, propylenediamine, trimethylenediamine, diethylenetriamin triethylenetetramine, hexamethylenediamine, heptamethylenediamine, octamethylenediamine, nonamethylenediamine, decamethytenediarnine, 1,12-dodecanediamine, 1,18-octadecanediamine, 3-methylheptamethylenediamine, 4,4-dimethylheptamethylenediamine, 4-methylnonamethylenediamine, 5-methylnonamethylenediamine, 2,5-dimethylhexamethylenediamine, 2,5-dimethylheptamethylenediamine, 2,2-diethylpropylenediamine, N-methyl-bis (3-aminopropyl) amine, 3-methoxyhexamethylenediamine, 1,2-bis(3-aminopropoxy)ethane, bis(3-aminopropyl)sulfide, 1,4-cyclohexanediamine, bis-(4-aminocyclohexyl) methane, m-phenylenediamine, p-phenylenediamine, 2,4-diaminotoluene, 2,6-diaminotoluene, m-xylylenediamine, p-xylylenediamine, 2-methyl-4,6-diethyl-1,3-phenylene-diamine, 5-methyl-4,6-diethyl-1,3-phenylene-diamine, benzidine, 3,3'- dimethylbenzidine, 3,3'-dimethoxybenzidine, 1,5-diaminonaphthalene, bis(4-aminophenyl) methane, bis(2-chloro-4-amino-3,5-diethylphenyl) methane, bis(4-aminophenyl) propane, 2,4-bis(b-amino-t-butyl) toluene, bis (p-b-amino-t-butylphenyl)ether, bis(p-b-methyl-o-aminophenyl) benzene, bis(p-b-methyl-o-aminopentyl) benzene, 1,3-diamino-4-isopropylbenzene, bis(4-aminophenyl)ether and 1,3-bis(3-aminopropyl) tetramethyldisiloxane. Mixtures of these amines can be used. Illustrative examples of amine compounds of formula (10) containing sulfone groups include but are not limited to, diamino diphenyl sulfone (DDS) and bis(aminophenoxy phenyl) sulfones (BAPS). Combinations Comprising any of the foregoing amines can be used.

The polyetherimides can be synthesized by the reaction of the bis(phthalimide) (8) with an alkali metal salt of a dihydroxy substituted aromatic hydrocarbon of the formula HO—V—OH wherein V is as described above, in the presence or absence of phase transfer catalyst. Suitable phase transfer catalysts are disclosed in U.S. Pat. No. 5,229,482. Specifically, the dihydroxy substituted aromatic hydrocarbon a bisphenol such as bisphenol A, or a combination of an alkali metal salt of a bisphenol and an alkali metal salt of another dihydroxy substituted aromatic hydrocarbon can be used.

In one embodiment, the polyetherimide comprises structural units of formula (5) wherein each R is independently p-phenylene or m-phenylene or a mixture comprising at least one of the foregoing; and T is group of the formula —O—Z—O— wherein the divalent bonds of the —O—Z—O— group are in the 3,3' positions, and Z is 2,2-diphenylenepropane group (a bisphenol A group). Further, the polyetherimide sulfone comprises structural units of formula (6) wherein at least 50 mole % of the R groups are of formula (4) wherein Q is —SO$_2$— and the remaining R groups are independently p-phenylene or m-phenylene or a combination comprising at least one of the foregoing; and T is group of the formula —O—Z—O— wherein the divalent bonds of the —O—Z—O— group are in the 3,3' positions, and Z is a 2,2-diphenylenepropane group.

The polyetherimide and polyetherimide sulfone can be used alone or in combination. In one embodiment, only the polyetherimide is used. In another embodiment, the weight ratio of polyetherimide:polyetherimide sulfone can be from 99:1 to 50:50.

The polyimides can have a weight average molecular weight (Mw) of 5,000 to 100,000 grams per mole (g/mole) as measured by gel permeation chromatography (GPO). In some embodiments the Mw can be 10,000 to 80,000. The molecular weights as used herein refer to the absolute weight averaged molecular weight (Mw).

The polyimides can have an intrinsic viscosity greater than or equal to 0.2 deciliters per gram (dl/g) as measured in m-cresol at 25° C. Within this range the intrinsic viscosity can be 0.35 to 1.0 dl/g, as measured in m-cresol at 25° C.

The polyimides can have a glass transition temperature of greater than 180° C., specifically of 200° C. to 500° C., as measured using differential scanning calorimetry (DSC) per ASTM test D3418. In some embodiments the polyimide, an in particular a polyetherimide has a glass transition temperature of 240 to 350° C.

The polyimides can have a melt index of 0.1 to 10 grams per minute (g/min), as measured by American Society for Testing Materials (ASTM) DI 238 at 340 to 370° C., using a 6.7 kilogram (kg) weight.

One process for the preparation of polyetherimides having structure (1) is referred to as the nitro-displacement process (X is nitro in formula (8)). In one example of the nitro-displacement process, N-methyl phthalimide is nitrated with 99% nitric acid to yield a mixture of N-methyl-4-nitrophthalimide (4-NPI) and N-methyl-3-nitrophthalimide (3-NPI). After purification, the mixture, containing approximately 95 parts of 4-NPI and 5 parts of 3-NPI, is reacted in toluene with the disodium salt of bisphenol-A (BPA) in the presence of a phase transfer catalyst. This reaction yields BPA-bisimide and NaNO$_2$ in what is known as the nitro-displacement step. After purification, the BPA-bisimide is reacted with phthalic anhydride in an imide exchange reaction to afford BPA-dianhydride (BPADA), which in turn is reacted with meta-phenylene diamine (MPD) in ortho-dichlorobenzene in an imidization-polymerization step to afford the product polyetherimide.

An alternative chemical route to polyetherimides having structure (1) is a process referred to as the chloro-displacement process (X is Cl in formula (8)). The chloro-displacement process is illustrated as follows: 4-chloro phthalic anhydride and meta-phenylene diamine are reacted in the presence of a catalytic amount of sodium phenyl phosphinate catalyst to produce the bischloro phthalimide of meta-phenylene diamine (CAS No. 148935-94-8). The bischloro phthalimide is then subjected to polymerization by chloro-displacement reaction with the disodium salt of BPA in the presence of a catalyst in ortho-dichlorobenzene or anisole solvent. Alternatively, mixtures of 3-chloro- and 4-chlorophthalic anhydride may be employed to provide a mixture of isomeric bischloro phthalimides which may be polymerized by chloro-displacement with BPA disodium salt as described above.

Siloxane polyetherimides can include polysiloxane/polyimide block copolymers having a siloxane content of greater than 0 and less than 40 weight percent (wt %) based on the total weight of the block copolymer. The block copolymer comprises a siloxane block of Formula (1):

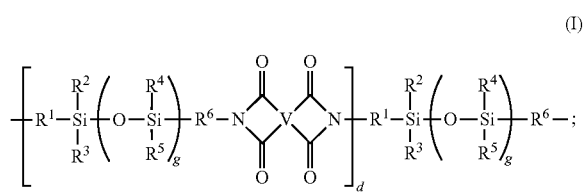

wherein $R^{1-6}$ are independently at each occurrence selected from the group consisting of substituted or unsubstituted, saturated, unsaturated, or aromatic monocyclic groups having 5 to 30 carbon atoms, substituted or unsubstituted, saturated, unsaturated, or aromatic polycyclic groups having 5 to 30 carbon atoms, substituted or unsubstituted alkyl groups having 1 to 30 carbon atoms and substituted or unsubstituted alkenyl groups having 2 to 30 carbon atoms, V is a tetravalent linker selected from the group consisting of substituted or unsubstituted, saturated, unsaturated, or aromatic monocyclic and polycyclic groups having 5 to 50 carbon atoms, substituted or unsubstituted alkyl groups having 1 to 30 carbon atoms, substituted or unsubstituted alkenyl groups having 2 to 30 carbon atoms and combinations comprising at least one of the foregoing linkers, g equals 1 to 30, and d is 2 to 20. Commercially available siloxane polyetherimides can be obtained from SABIC Innovative Plastics under the brand name SILTEM* (*Trademark of SABIC Innovative Plastics IP B.V.)

The polyimide resin can have a weight average molecular weight (Mw) within a range having a lower limit and/or an upper limit. The range can include or exclude the lower limit and/or the upper limit. The lower limit and/or upper limit can be selected from 5000, 6000, 7000, 8000, 9000, 10000, 11000, 12000, 13000, 14000, 15000, 16000, 17000, 18000, 19000, 20000, 21000, 22000, 23000, 24000, 25000, 26000, 27000, 28000, 29000, 30000, 31000, 32000, 33000, 34000, 35000, 36000, 37000, 38000, 39000, 40000, 41000, 42000, 43000, 44000, 45000, 46000, 47000, 48000, 49000, 50000, 51000, 52000, 53000, 54000, 55000, 56000, 57000, 58000, 59000, 60000, 61000, 62000, 63000, 64000, 65000, 66000, 67000, 68000, 69000, 70000, 71000, 72000, 73000, 74000, 75000, 76000, 77000, 78000, 79000, 80000, 81000, 82000, 83000, 84000, 85000, 86000, 87000, 88000, 89000, 90000, 91000, 92000, 93000, 94000, 95000, 96000, 97000, 98000, 99000, 100000, 101000, 102000, 103000, 104000, 105000, 106000, 107000, 108000, 109000, and 110000 daltons. For example, the polyimide resin can have a weight average molecular weight (Mw) from 5,000 to 100,000 daltons, from 5,000 to 80,000 daltons, or from 5,000 to 70,000 daltons. The primary alkyl amine modified polyimide will have lower molecular weight and higher melt flow than the starting, unmodified, polyimide.

The polyimide resin can be selected from the group consisting of a polyetherimide, for example as described in U.S. Pat. Nos. 3,875,116; 6,919,422 and 6,355,723 a silicone polyetherimide, for example as described in U.S. Pat. Nos. 4,690,997: 4,808,686 a polyetherimide sulfone resin, as described in U.S. Pat. No. 7,041,773 and combinations thereof, incorporated herein their entirety.

The polyimide resin can be a silicone polyetherimide comprising a dimethyl silicone in an amount within a range having a lower limit and/or an upper limit. The range can include or exclude the lower limit and/or the upper limit. The lower limit and/or upper limit can be selected from 0, 0.1, 0.5, 1, 1.5, 2, 2.5, 3, 3.5, 4, 4.5, 5, 5.5, 6, 6.5, 7, 7.5, 8, 8.5, 9, 9.5, 10, 10.5, 11, 11.5, 12, 12.5, 13, 13.5, 14, 14.5, 15, 15.5, 16, 16.5, 17, 17.5, 18, 18.5, 19, 19.5, 20, 20.5, 21, 21.5, 22, 22.5, 23, 23.5, 24, 24.5, 25, 25.5, 26, 26.5, 27, 27.5, 28, 28.5, 29, 29.5, 30, 30.5, 31, 31.5, 32, 32.5, 33, 33.5, 34, 34.5, 35, 35.5, 36, 36.5, 37, 37.5, 38, 38.5, 39, 39.5, 40, 40.5, 41, 41.5, 42, 42.5, 43, 43.5, 44, 44.5, 45, 45.5, 46, 46.5, 47, 47.5, 48, 48.5, 49, 49.5, 50, 50.5, 51, 51.5, 52, 52.5, 53, 53.5, 54, 54.5, 55, 55.5, 56, 56.5, 57, 57.5, 58, 58.5, 59, 59.5, and 60 weight percent. For example, the polyimide resin can be a silicone polyetherimide comprising from 1 to 40 weight percent of a dimethyl silicone, or from 5 to 40 weight percent of a dimethyl silicone. The polyimide resin can be a silicone polyetherimide comprising an amount of a dimethyl silicone, as described above, the dimethyl silicone can have a silicone block length within a range having a lower limit and/or an upper limit. The range can include or exclude the lower limit and/or the upper limit. The lower limit and/or upper limit can be selected from 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, and 75 silicone repeat units. For example, the polyimide resin can be a silicone polyetherimide comprising from 5 to 40 repeat units of a dimethyl silicone, that is, having a silicone block length of 5 to 50 repeat units.

The polyimide resin can have a glass transition temperature within a range having a lower limit and/or an upper limit. The range can include or exclude the lower limit and/or the upper limit. The lower limit and/or upper limit can be selected from 100, 110, 120, 130, 140, 150, 160, 170, 180, 190, 200, 210, 220, 230, 240, 250, 260, 270, 280, 290, and 300 degrees Celsius. For example, the polyimide resin can have a glass transition temperature (Tg) greater than about 200 degrees Celsius.

The polyimide resin can be substantially free of benzylic protons. The polyimide resin can be free of benzylic protons. The polyimide resin can have an amount of benzylic protons below 100 ppm. In one embodiment, the amount of benzylic protons ranges from more than 0 to below 100 ppm. In another embodiment, the amount of benzylic protons is not detectable.

The polyimide resin can be substantially free of halogen atoms. The polyimide resin can be free of halogen atoms. The polyimide resin can have an amount of halogen atoms below 100 ppm. In one embodiment, the amount of halogen atoms ranges from more than 0 to below 100 ppm. In another embodiment, the amount of halogen atoms is not detectable.

The organic compound can comprise at least one primary aliphatic amine. The primary aliphatic amine can be without a direct linkage of a nitrogen to an aryl group. Exemplary amines are primary alkyl amine such as stearyl amine, decyl amine, dodecyl amine, tetradecyl amine, 3-methyl-1-octyl amine, 3-ethyl-hexyl amine, 4-phenyl butyl amine, 2,7-diphenyl heptyl amine, 1 methyl-3-phenyl amine, amino hexanoic acid and the like. In some instances the primary amine will be a $C_{10}$-$C_{20}$ alkyl amine The primary aliphatic amine can be without a functionality selected from halogen functionality, a hydroxyl functionality, a sulfonic acid functionality, a sulfonic acid salt functionality, and combinations thereof.

The organic compound can comprise a primary aliphatic amine having a carbon chain length within a range having a lower limit and/or an upper limit. The range can include or exclude the lower limit and/or the upper limit. The lower limit and/or upper limit can be selected from 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, and 50. For example, the organic compound can comprise a $C_6$ to $C_{36}$ primary aliphatic amine.

The organic compound can comprise a primary aliphatic amine, such as a $C_6$ to $C_{36}$ primary aliphatic amine, in an amount within a range having a lower limit and/or an upper limit. The range can include or exclude the lower limit and/or the upper limit. The lower limit and/or upper limit can be selected from 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, 4, 4.1, 4.2, 4.3, 4.4, 4.5, 4.6, 4.7, 4.8, 4.9, 5, 5.1, 5.2, 5.3, 5.4, 5.5, 5.6, 5.7, 5.8, 5.9, 6, 6.1, 6.2, 6.3, 6.4, 6.5, 6.6, 6.7, 6.8, 6.9, 7, 7.1, 7.2, 7.3, 7.4, 7.5, 7.6, 7.7, 7.8, 7.9, 8, 8.1, 8.2, 8.3, 8.4, 8.5, 8.6, 8.7, 8.8, 8.9, 9, 9.1, 9.2, 9.3, 9.4, 9.5, 9.6, 9.7, 9.8, 9.9, 10, 10.1, 10.2, 10.3, 10.4, 10.5, 10.6, 10.7, 10.8, 10.9, 11, 11.1, 11.2, 11.3, 11.4, 11.5, 11.6, 11.7, 11.8, 11.9, 12, 12.1, 12.2, 12.3, 12.4, 12.5, 12.6, 12.7, 12.8, 12.9, 13, 13.1, 13.2, 13.3, 13.4, 13.5, 13.6, 13.7, 13.8, 13.9, 14, 14.1, 14.2, 14.3, 14.4, 14.5, 14.6, 14.7, 14.8, 14.9, 15, 15.1, 15.2, 15.3, 15.4, 15.5, 15.6, 15.7, 15.8, 15.9, 16, 16.1, 16.2, 16.3, 16.4, 16.5, 16.6, 16.7, 16.8, 16.9, 17, 17.1, 17.2, 17.3, 17.4, 17.5, 17.6, 17.7, 17.8, 17.9, 18, 18.1, 18.2, 18.3, 18.4, 18.5, 18.6, 18.7, 18.8, 18.9, 19, 19.1, 19.2, 19.3, 19.4, 19.5, 19.6, 19.7, 19.8, 19.9, and 20 weight percent. For example, the organic compound can comprise from 0.1 to 10.0 weight percent, or from 0.1 to 5.0 weight percent of a $C_6$ to $C_{36}$ primary aliphatic amine.

The organic compound can be a primary aliphatic amine further comprising a carboxylic acid functionality. Exemplary amino carboxylic acids are; amino hexanoic acids, amino octanoic acids, amino decanoic acids, amino ethyl benzoic acids, asparagine, glutamic acid, alanine and mixtures thereof.

The aryl amine/alkyl imide functionalized polyimide can have a melt viscosity (MV) as measured by ASTM4440 at 340 degrees Celsius that is lower than the melt viscosity of the polyimide resin by a percentage within a range having a lower limit and/or an upper limit. The range can include or exclude the lower limit and/or the upper limit. The lower limit and/or upper limit can be selected from 1, 2, 3, 4, 5, 6, 7, 8, 9, 10, 11, 12, 13, 14, 15, 16, 17, 18, 19, 20, 21, 22, 23, 24, 25, 26, 27, 28, 29, and 30 percent. For example, the aryl amine functionalized polyimide can have a melt viscosity as measured by ASTM4440 at 340 degrees Celsius that is at least 15% lower than the polyimide resin.

The aryl amine/alkyl imide functionalized polyimide can have a melt flow index (MVR) as measured by ASTM D1238 with a 61 Kg weight at 337 degrees Celsius within a range having a lower limit and/or an upper limit. The range can include or exclude the lower limit and/or the upper limit. The lower limit and/or upper limit can be selected from 1, 2, 3, 4, 6, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 105, 110, 115, 120, 125, 130, 135, 140, 145, and 150 cc/10 min. For example, the aryl amine/alkyl imide functionalized polyimide can have a melt flow index as measured by ASTM D1238 with a 6.7 Kg weight at 337 degrees Celsius of from 5.0 to 100.0 co/10 min.

The aryl amine functionalized polyimide can have a glass transition temperature (Tg) within a range having a lower limit and/or an upper limit. The range can include or exclude the lower limit and/or the upper limit. The lower limit and/or upper limit can be selected from 150, 155, 160, 165, 170, 175, 180, 185, 190, 195, 200, 205, 210, 215, 220, 225, 230, 235, 240, 245, 250, 255, 260, 265, 270, 275, 280, 285, 290, 295, and 300 degrees. Celsius. For example, the aryl amine functionalized polyimide can have a glass transition temperature (Tg) greater than about 180 degrees Celsius. Tg may be determined by differential scanning calorimetry (DSC) as described in ASTM D3418.

The resultant aryl amine functionalized polyimide can be end-capped with an alkyl imide functionality having a number of carbon atoms within a range having a lower limit and/or an upper limit. The range can include or exclude the lower limit and/or the upper limit. The lower limit and/or upper limit can be selected from 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, and 50. For example, the resultant aryl amine functionalized polyimide can be end-capped with a $C_6$ to $C_{36}$ alkyl imide functionality.

Still other embodiments relate to an aryl amine functionalized polyimide, having aryl amine functionality in excess of any anhydride functionality. The aryl amine functionalized polyimide can have an aryl amine content that is a mole percentage of the aryl amine functionalized polyimide, the mole percentage can be within a range having a lower limit and/or an upper limit. The range can include or exclude the lower limit and/or the upper limit. The lower limit and/or upper limit can be selected from 0.05, 0.1, 0.15, 0.2, 0.25, 0.3, 0.35, 0.4, 0.45, 0.5, 0.55, 0.6, 0.65, 0.7, 0.75, 0.8, 0.85, 0.9, 0.95, 1, 1.05, 1.1, 1.15, 1.2, 1.25, 1.3, 1.35, 1.4, 1.45, 1.5, 1.55, 1.6, 1.65, 1.7, 1.75, 1.8, 1.85, 1.9, 1.95, 2, 2.05, 2.1, 2.15, 2.2, 2.25, 2.3, 2.35, 2.4, 2.45, 2.5, 2.55, 2.6, 2.65, 2.7, 2.75, 2.8, 2.85, 2.9, 2.95, 3, 3.1, 3.2, 3.3, 3.4, 3.5, 3.6, 3.7, 3.6, 3.9, 4, 4.5, 5, 5.5, 6, 6.5, 7, 7, 5, 8, 8.5, 9, 9.5 and 10 mole percent. For example, the aryl amine functionalized polyimide can have an aryl amine content of from 0.15 to 3.0 mole percent, or from 0.3 to 1.5 mole percent, of the aryl amine functionalized polyimide. The concentration of amine and anhydride end groups can be analyzed by various titration and spectroscopic Methods well known in the art. Spectroscopic methods include, infrared, nuclear magnetic resonance. Raman spectroscopy, and fluorescence. Examples of infrared methods are described in J, A. Kreuz, et al, J. Poly. Sci. Part A-1, vol. 4, pp. 2067 2616 (1966). Examples of titration methods are described in Y. J. Kim, et al, Macromolecules, vol. 26, pp. 1344 1358 (1993). It may be advantageous to make derivatives of polymer end groups to enhance measurement sensitivity using variations of methods as described in K. P. Chan et al., Macromolecules, vol. 27, p. 6731 (1994) and J. S. Chao, Polymer Bull., vol. 17, p. 397 (1987).

Various embodiments relate to compositions made by the above-described processes. For example, some embodiments relate to an aryl amine functionalized polyimide composition made by the above-described process. Such a resin can be end capped with an alkyl imide functionality having an number of carbon atoms within a range having a lower limit and/or an upper limit. The range can include or exclude the lower limit and/or the upper limit. The lower omit and/or upper limit can be selected from 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, and 50 For example, the resin can be end-capped with a $C_6$ to $C_{36}$ alkyl imide functionality.

Other embodiments relate to an aryl amine functionalized polyimide composition made by the above-described process, wherein the resin has a change in melt viscosity (MV) of its initial value after held in the melt for 30 minutes at 340 degrees Celsius as per ASTM a 4440. The change in melt viscosity can be within a range having a lower limit and/or an upper limit. The range can include or exclude the lower limit and/or the upper limit. The lower limit and/or upper limit can be selected from 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, and 40 percent of the initial polyimide melt viscosity. For example, the resin can have a change in melt viscosity of less than 20% of its initial value after held in the melt for 30 minutes at 340 degrees Celsius as per ASTM D4440.

Still other embodiments relate to an aryl amine functionalized polyimide, having aryl amine functionality in excess of any anhydride functionality.

The aryl amine functionalized polyimide can have melt viscosity (MV) as measured by ASTM4440 at 340 degrees Celsius that is lower than the melt viscosity of the polyimide resin by a percentage within a range having a lower limit and/or an upper limit. The range can include or exclude the lower limit and/or the upper limit. The lower limit and/or upper limit can be selected from 1, 2, 3, 4, 5, 6, 7, 8, 9, 10, 11, 12, 13, 14, 15, 16, 17, 18, 19, 20, 21, 22, 23, 24, 25, 26, 27, 28, 29, and 30 percent. For example, the aryl amine functionalized polyimide can have melt viscosity as measured by ASTM4440 at 340 degrees Celsius that is at least 15% lower than the polyimide resin.

The aryl amine functionalized polyimide can have a melt flow index (MVR) as measured by ASTM D1238 with a 6.7 Kg weight at 337 degrees Celsius within a range having a lower limit and/or an upper limit. The range can include or exclude the lower limit and/or the upper limit. The lower limit and/or upper limit can be selected from 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 96, 99, 100, 101, 102, 103, 104, 105, 106, 107, 108, 109, 110, 115, 120, 125, 130, 135, 140, 145, and 150 cc/10 min. For example, the aryl amine functionalized polyimide can have a melt flow index as measured by ASTM D1238 with a 6.7 Kg weight at 337 degrees Celsius of from 5.0 to 100.0 cc/10 min.

The aryl amine functionalized polyimide can have a glass transition temperature (Tg) within a range having a lower limit and/or an upper limit. The range can include or exclude the lower limit and/or the upper limit. The lower limit and/or upper limit can be selected from 150, 155, 160, 165, 170, 175, 180, 185, 190, 195, 200, 205, 210, 215, 220, 225, 230, 235, 240, 245, 250, 255, 260, 265, 270, 275, 280, 285, 290, 295, and 300 degrees Celsius. For example, the aryl amine functionalized polyimide can have a glass transition temperature (Tg) greater than about 180 degrees Celsius.

The aryl amine functionalized polyimide can be end capped with an alkyl imide functionality having a number of carbon atoms within a range having a lower limit and/or an upper limit. The range can include or exclude the lower limit and/or the upper limit. The lower limit and/or upper limit can be selected from 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, and 50. For example, the aryl amine functionalized polyimide can be end capped with a $C_6$ to $C_{36}$ alkyl imide functionality.

The aryl amine functionalized polyimide can have an aryl amine content related to the aryl amine functionalized polyimide by a mole percentage within a range having a lower limit and/or an upper limit. The range can include or exclude the lower limit and/or the upper limit. The lower limit and/or upper limit can be selected from 0.05, 0.10, 0.15, 0.2, 0.25, 0.3, 0.35, 0.4, 0.45, 0.5, 0.55, 0.6, 0.65, 0.7, 0.75, 0.8, 0.85, 0.9, 0.95, 1, 1.05, 1.1, 1.15, 1.2, 1.25, 1.3, 1.35, 1.4, 1.45, 1.5, 1.55, 1.6, 1.65, 1.7, 1.75, 1.8, 1.85, 1.9, 1.95, 2, 2.05, 2.1, 2.15, 2.2, 2.25, 2.3, 2.35, 2.4, 2.45, 2.5, 2.55, 2.6, 2.65, 2.7, 2.75, 2.8, 2.85, 2.9, 2.95, 3, 3.1, 3.2, 3.3, 3.4, 3.5, 3.6, 3.7, 3.8, 3.9, 4, 4.5, 5, 5.5, 6, 6.5, 7, 7.5, 8, 8.5, 9, 9.5, and 10 mole percent. For example, the aryl amine functionalized polyimide can have an aryl amine content of from 0.15 to 3.0 mole, or from 0.3 to 1.5 mole percent, of the aryl amine functionalized polyimide.

Further embodiments relate to articles comprising an alkyl imide and aryl amine functionalized polyimide, having an aryl amine functionality in excess of any anhydride functionality. The alkyl imide and aryl amine functionalized polyimide can be produced by the above-described process.

The article can be selected from the group consisting of a fiber, a film, a sheet, an adhesive, molded parts and combinations thereof.

The article can be a fiber having a denier per filament (dpf) within a range having a lower limit and/or an upper limit. The range can include or exclude the lower limit and/or the upper limit. The lower limit and/or upper limit can be selected from 0.1, 0.2, 0.3, 0.4, 0.5, 0.6, 0.7, 0.8, 0.9, 1, 1.1, 1.2, 1.3, 1.4, 1.5, 1.6, 1.7, 1.3, 1.9, 2, 2.1, 2.2, 2.3, 2.4, 2.5, 2.6, 2.7, 2.8, 2.9, 3, 3.5, 4, 4.5, 5, 5.5, 6, 6.5, 7, 7.5, 8, 8.5, 9, 9.5, and 10 dpf. For example, the article can be a fiber having a denier per filament (dpf) of less than or equal to 2.0. The fiber can have any cross-section, for example, circular, oval, star shaped, crescent, double horse shoe, bilobe, trilobe or the like. The fiber may also be hollow having one or more channels.

The article can be a fiber having a tenacity within a range having a lower limit and/or an upper limit. The range can include or exclude the lower limit and/or the upper limit. The lower limit and/or upper limit can be selected from 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, 2.5, 3, 3.5, 4, 4.5, 5, 5.5, 6, 6.5, 7, 7.5, 8, 8.5, 9, 9.5, and 10 g/denier. For example, the article can be a fiber having a tenacity of greater than or equal to greater than 1.0 g/denier, or of greater than or equal to 1.5 g/denier.

The article can be a fiber having shrinkage at 180 degrees Celsius within a range having a lower limit and/or an upper limit. The range can include or exclude the lower limit and/or the upper limit. The lower limit and/or upper limit can be selected from 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, 2.5, 3, 3.5, 4, 4.5, 5, 5.5, 6, 6.5, 7, 7.5, 8, 8.5, 9, 9.5, and 10 percent. For example, the article can be a fiber having shrinkage at 180 degrees Celsius of less than 1.0%.

The article can be a fiber, and the article can further comprise a fiber finish, or coating, selected from the group consisting of polyethers, polyesters, polyamides, silicones, urethanes, polyolefins, epoxides, acrylates, polyols, alcohols, fatty acids, fatty acid salts amides, esters, alkyl sulfonates, amines, ammonium salts, phosphates, phosphites, and combinations thereof. The fiber finish can be applied by any convention means. In some preferred instances the fiber coating will be an aqueous suspension, emulsion or solution.

Alternatively, the article can be a fabric made from fibers made from our composition. Fabrics can be made by any suitable method, e.g., knitting or weaving, spreading, crocheting, or bonding that may be used in production of fabrics having desired features.

Advantageously, our invention, now provides useful previously unavailable benefits. The use of our terminated PEI enables the production of resins that unexpectedly and remarkably, relatively higher flow and melt stability properties, as compared to a polyetherimide that is not similarly terminated. Our material enables makes it possible to make fibers with a combination of useful properties and makes it possible to spin fibers having low denier features for extended periods of time.

EXAMPLES

The purpose of Examples 1 to 35 was to make aryl amine terminated polyetherimides, polyetherimide sulfones and silicone polyetherimides. Examples of the invention are designated by numbers, letters designate comparative control Examples.

Techniques & Procedures

Blends were prepared by extrusion of mixtures of octadecyl amine ($C_{18}NH_2$), with polyetherimides (ULTEM 1000, 1010 and 1040), polyetherimide sulfones (ULTEM XH6050 or U1) or a silicone polyimide copolymer (SILTEM STM1700) resin in a 30 mm co-rotating twin screw extruder with six barrel sections. In some instances 6-amino hexanoic acid (AHA) or bis(3-amino propyl) polydimethyl siloxane (G10) was mixed with the polyetherimide (PEI) resins. The mixtures were prepared by mixing either PEI pellets, fine grind powders or a mixture of the two, with the powdered octadecyl amine, or AHA and then tumble blending for at least 10 minutes at room temperature. In the case of the liquid G10 additive, PEI pellets were first coated with the liquid and mixed and then a second portion of powdered PEI resin was added to the coated pellets, this facilitated feeding to the extruder. Compositions are listed in the tables as wt. % of the total composition unless noted otherwise. The blends were fed into an extruder run at about 300 rpm. The extruder was vented to the atmosphere, no external vacuum was applied. The extruder was set at about 250 to 330° C. for the ULTEM 1000, 1010, 1040 or the Siltem STM1700 blends. The ULTEM XH6050 or U1 blends were extruded hotter (300 to 370° C. for XH6050 or 300 to 400° C. for U1) due to their higher Tg. The chemically modified extrudate was cooled in a water bath, pelletized and dried at 150° C. Test samples were injection molded at a set temperature of 300 to 360° C. and a mold temperature of 120° C. using a 30 sec. cycle time. All molded samples were conditioned for at least 48 h at 50% relative humidity prior to testing.

Properties were measured using ASTM test methods. Melt flow (MVR) was run on dried pellets as per ASTM D1238 at 300, 337 or 400° C. using a 6.7 Kg weight with either a 6 minute or 18 minute equilibration. MVR was measured as cc/10 minutes. Higher values indicate higher melt flow. Viscosity vs. shear rate (MVM) was run on a capillary rheometry at 300, 340, 350 or 400° C. as per ASTM test method D3835 using a shear rate of about 30 to 700011/sec. MVM viscosity was measured in Pascal seconds (Pa-s). Lower values indicate higher melt flow. Viscosity vs. time, also known as melt dwell or time sweep, was run using a parallel plate/cone-plate fixture rheometer at 300, 340 or 350° C. for 30 minutes at 10 radians/sec. under nitrogen as per ASTM D4440. Viscosity at the onset (after a 6 minute equilibration) and end of the test (30 minutes after equilibration) were compared to show the relative stability of the molten polymer. Viscosity was measured as poise (P).

Molecular weight was measured by gel permeation chromatography (GPC) as per ASTM method D5296, Molecular weight is reported as both weight average (Mw) and number average (Mn) molecular weight Polystyrene standards were used for calibration. The glass transition temperature (Tg) was measured using differential scanning calorimetry (DSC) as per ASTM method D3418 at a 20° C./min, heating rate. Tg was recorded on the second heat. Tensile strength was measured on injection molded parts as per ASTM method D638 and is reported as mega Pascals (MPa). Tensile modulus was measured as tangent, tensile strength is reported at yield (Y) and percent elongation (% E) reported at break. Crosshead speed was 50 mm/rain. Notched Izod (NI) and reversed notched Izod (RNI) were measured as per ASTM D256 using a 5 lb hammer. Multiaxial impact (MAI) was measured on 3.2 mm disc as per as ASTM D3763; total impact energy is reported as Joules (J). Heat distortion temperature (HDT) was measured on 3.2 mm bars at 66 or 264 psi as per ASTM method 0648 and reported as degrees centigrade (° C.). Optical properties; percent transmission (% T), percent haze (% H) and yellowness index (YI), were measured on as molded 3.2 mm discs as per ASTM method D1003.

31P NMR analysis, using phosphorous functionalization of the polyetherimide end groups, was used to characterize the resins. A sample was dissolved in CDCl3 (deutero chloroform) with pyridine and chromium (III) AcAc (acetylacetonate); trichloro phenol was used as a standard. The active phosphorylating agent, which derivatized the amine and carboxylic acid functionality into phosphorous containing species, was o-phenylene, phosphorochloridite (CAS#1641-40-3). The resin solutions were allowed to react for at least 15 minutes, converted into their phosphorus derivatives and analyzed by NMR (nuclear magnetic resonance). Phosphorus 31 isotope signals were observed and quantified vs. the trichloro phenol standard. The chemical shifts were 135.7 ppm for the aryl amine ($NH_2$) and 129.3 ppm for the aliphatic carboxylic acid (COOH). No signals were observed in the resin samples for the alkyl amine starting materials; octadecyl amine, amino hexanoic acid or G10.

PEI stoichiometry (IR Stoic $NH_2$ excess) was measured on ~0.5 mm pressed films using a FTIR (Fourier Transform infra Red) spectrometer. The amine peak at 3381 $cm^{-1}$ was measured and compared to the anhydride group absorbance at 1901 $cm^{-1}$. Using the molar absorption values measured from model compounds the end group concentrations (mole % amine and mole % anhydride) were determined. The difference in the amine minus anhydride was calculated and reported as IR stoic $NH_2$ excess. The values are the average of at least two points from the same film and reported as mole % of the polymer.

Fiber tensile strength and tenacity were measured as per ASTM D2256, tensile strength reported as mega Pascals (MPa), tenacity is reported as grams/denier (g/d). Percent fiber shrinkage was tested at 180 and 200° C. as per ASTM D2259.

The Materials used to make the make aryl amine terminated polyetherimides polyetherimide sulfones and silicone polyetherimides of the Examples are described in Table 1.

TABLE 1

| Material | Description | CAS Number | Vendor |
|---|---|---|---|
| U1000 | ULTEM 1000 a polymer of bisphenol-A dianhydride and m-phenylene diamine, Mw ~54K | 61128-46-9 | SABIC Innovative Plastics |
| U1010 | ULTEM 1010 a polymer of bisphenol-A dianhydride and m-phenylene diamine, Mw ~44K | 61128-46-9 | SABIC Innovative Plastics |
| U1040 | ULTEM 1040 a polymer of bisphenol-A dianhydride and m-phenylene diamine, Mw ~32K | 61128-46-9 | SABIC Innovative Plastics |
| U6050 | EXTEM XH6050 a polymer of bisphenol-A dianhydride and diamine diphenyl sulfone, Mw ~38K | 77699-82-2 | SABIC Innovative Plastics |
| U1 | U1 a polymer of oxydiphthalic dianhydride and diamine diphenyl sulfone, Mw ~20K | 859766-55-5 | SABIC Innovative Plastics |
| STM1700 | SILTEM STM1700 a polymer of bisphenol-A dianhydride, m-phenylene diamine and ~20 wt % bis (3-amino propyl) polydimethyl siloxane, Mw ~39K | 99904-16-2 | SABIC Innovative Plastics |

TABLE 1-continued

| Material | Description | CAS Number | Vendor |
|---|---|---|---|
| G10 | bis (3-amino propyl) terminated polydimethyl siloxane, ~10 silicone repeat units Mw ~700 | 106214-84-0 | Sigma Aldrich Chemical |
| $C_{18}NH_2$ | Armeen 18D, octadecyl amine ($C_{18}H_{37}NH_2$) | 124-30-1 | Akzo Nobel |
| AHA | 6-amino hexanoic acid | 60-32-2 | Sigma Aldrich Chemical |

Example 1-13

The results we obtained to prepare polyetherimides with both aryl amine and octadecyl imide end groups are shown in Tables 2 to 6:

TABLE 2

PEI U1010 with Octadecyl Amine

| | Example | | | | | |
|---|---|---|---|---|---|---|
| | A | 1 | 2 | 3 | 4 | 5 |
| | Composition | | | | | |
| | U1010 PEI | 0.1% $C_{18}NH_2$ | 0.3% $C_{18}NH_2$ | 0.5% $C_{18}NH_2$ | 0.7% $C_{18}NH_2$ | 1.0% $C_{18}NH_2$ |
| MVR 6 min 337° C. 6.7 Kg | 17.4 | 21.5 | 28.0 | 39.9 | 50.1 | 82.2 |
| MVR 18 min 337° C. 6.7 Kg | 17.5 | 22.3 | 30.0 | 41.8 | 50.2 | 82.6 |
| Visc MV (P) dwell 340° C. start | 15341 | 13434 | 9739 | 7707 | 5846 | 3726 |
| Visc MV (P) dwell 340° C./30 min. | 15326 | 13442 | 9884 | 7726 | 5787 | 3598 |
| GPC Mw | 44033 | 42938 | 40658 | 38801 | 37647 | 35574 |
| GPC Mn | 18325 | 18338 | 17723 | 16685 | 16819 | 16443 |
| % reduction Mw | 0 | 2.5 | 7.7 | 11.9 | 14.5 | 19.2 |
| Tg DSC ° C. | 218.4 | 217.2 | 214.5 | 212.9 | 211.3 | 207.9 |
| IR Stoic NH2 excess, mole % | −0.03 | 0.04 | 0.14 | 0.36 | 0.48 | 0.68 |
| 31P NMR NH2 ppm | 13 | not run | not run | not run | 60 | 148 |
| T Mod MPa | 3860 | 3920 | 3910 | 3950 | 3960 | 3930 |
| T Str (Y) MPa | 114 | 113 | 108 | 101 | 99 | 105 |
| % T 3.2 mm | 64.9 | 63.4 | 63.1 | 68.2 | 70.6 | 71.7 |
| % H | 3.0 | 1.7 | 2.2 | 2.5 | 2.2 | 2.4 |

Discussion

Our results show that our aryl-amine terminated PEI exhibits, unexpectedly and remarkably, relatively higher flow and melt stability properties, as compared to a polyetherimide that is not aryl-amine and octadecyl imide terminated. Melt Stability results are evidenced by the dwell test. Higher flaw properties are evidenced by melt viscosity results.

More particularly, Examples 1 to 6 in Table 2 show the modification of polyetherimide ULTEM1010 with 0.01 to 1.0 wt. % octadecyl amine. After a single pass through the extruder the modified resins (Examples 1 to 5) show a higher melt flow than the control Example A, as evidenced by an increase in MVR at 337° C. from 17.4 to 82.2 cc/g. In addition the modified resins show very good melt stability with only a small change in MVR comparing 6 to 18 minute melt residence. Likewise after a 30 min, melt dwell at 340° C. there is little change between the initial (start) and final (30 min.) melt viscosity (MV). This stable melt viscosity indicates that any chemical reaction that may have occurred during extrusion is essentially complete and there is little, if any, further change in the modified PEI resin melt viscosity. Also note that while the octadecyl amine level is only slightly changed from 0.1 to 1.0 wt % in Examples 1 to 5 the starting melt viscosity (MV) at 340° C. is sharply tower going from 15431 to 3726 poise (P). Further the modified resins of Example 1 to 5 retain clarity and have slightly improved percent transmission (% T) and lower haze (% H). Tensile strength and modulus are retained or slightly improved. The glass transition temperature (Tg) is slightly reduced for the modified PEI resins, but even with 1 wt % octadecyl amine is still above 200° C.

Chemical analysis by infra-red (IR) spectroscopy shows that there is an increase in the aryl amine functionality of the modified PEI resins of Example 1 to 5 compared to the control Example A. Example A has an excess of anhydride functionally over amine end groups giving a negative amine stoichiometry value of −0.03 mole %. The modified resins 1 to 5 show the amine excess increasing to as high as 0.68 mole %. Likewise a phosphorous NMR (31P NMR) analysis of the phosphorus derivatives of the modified resins 4 and 5 show an increase in the aryl amine signal from 13 ppm aryl amine in control Example A to 60 and 148 ppm respectively in Examples 4 and 5.

In a further characterization Examples 1 to 5 were compared to control Example A in terms of their viscosity vs. shear rate (MVM) at 340° C. Table 3 shows that with higher levels of octadecyl amine the modified PEI resins show improved melt flow (lower viscosity than Example A) at a wide range of shear rates (29 to 7018 1/sec.) normally encountered in melt forming processes such as injection molding.

TABLE 3

MVM Viscosity vs. Shear Rate U1010 w Octadecyl Amine

| | Example | | | | |
|---|---|---|---|---|---|
| | A | 1 | 2 | 3 | 4 | 5 |
| | | | Composition | | | |
| Shear Rate (1/sec.) | U1010 PEI | 0.1% $C_{18}NH_2$ | 0.3% $C_{18}NH_2$ | 0.5% $C_{18}NH_2$ | 0.7% $C_{18}NH_2$ | 1.0% $C_{18}NH_2$ |
| | | Shear Viscosity (Pa-s) at 340° C. | | | | |
| 29 | 2089 | 1636 | 1238 | 996 | 732 | 443 |
| 53 | 2016 | 1713 | 1352 | 983 | 804 | 453 |
| 99 | 1851 | 1606 | 1193 | 980 | 735 | 438 |
| 200 | 1518 | 1319 | 1031 | 791 | 608 | 419 |
| 292 | 1346 | 1209 | 959 | 767 | 620 | 408 |
| 501 | 1085 | 963 | 780 | 644 | 517 | 346 |
| 642 | 957 | 850 | 703 | 586 | 479 | 317 |
| 1002 | 756 | 680 | 571 | 490 | 407 | 285 |

TABLE 3-continued

MVM Viscosity vs. Shear Rate U1010 w Octadecyl Amine

| | Example | | | | |
|---|---|---|---|---|---|
| | A | 1 | 2 | 3 | 4 | 5 |
| | | | Composition | | | |
| Shear Rate (1/sec.) | U1010 PEI | 0.1% $C_{18}NH_2$ | 0.3% $C_{18}NH_2$ | 0.5% $C_{18}NH_2$ | 0.7% $C_{18}NH_2$ | 1.0% $C_{18}NH_2$ |
| | | Shear Viscosity (Pa-s) at 340° C. | | | | |
| 1503 | 590 | 540 | 460 | 403 | 339 | 248 |
| 3008 | 391 | 357 | 313 | 277 | 236 | 182 |
| 5011 | 262 | 243 | 214 | 193 | 165 | 131 |
| 7018 | 203 | 191 | 171 | 153 | 133 | 108 |

In Table 4 (Examples 6 to 9) the blends of polyetherimide U1010 (control Example B) are combined with higher amounts (1.0 to 5.0 wt. %) of octadecyl amine. The higher levels of octadecyl amine give an even larger increase in melt flow as seen in yet higher MVR (as high as 129 cc/10 min) and lower initial MV (as low as 441 P with 3% octadecyl amine in Example 8). Note that for these very high flow PEI resins the MVR was run at 300 DC as opposed to the 337 DC temperature used in Table 2. With 5% octadecyl amine (Example 9) the melt flow was so high it could not be measured at 340 DC using the melt dwell apparatus. The IR stoichiometry and 31P NMR show a very large increase in aryl amine functionality of the modified resins Examples 6 to 9. With higher octadecyl amine the Tg is reduced compared to control Example B, but even with 5 wt. % octadecyl amine the Tg is above 185° C.

TABLE 4

U1010 w Higher Amounts of Octadecyl Amine

| | Example | | | | |
|---|---|---|---|---|---|
| | B | 6 | 7 | 8 | 9 |
| | | | Composition | | |
| | U1010 PEI | 1% $C_{18}NH_2$ | 2% $C_{18}NH_2$ | 3% $C_{18}NH_2$ | 5% $C_{18}NH_2$ |
| MVR 300° C. 6 min 6.7 Kg | 2.0 | 8.8 | 38.6 | 123 | 129.0 |
| MVR 300° C. 18 min 6.7 Kg | 2.7 | 9.5 | 43.8 | 143 | 162.0 |
| GPC Mw | 43802 | 35605 | 29466 | 26731 | 26275 |
| GPC Mn | 18933 | 16141 | 13203 | 11632 | 10937 |
| Visc MV (P) dwell 340° C. start | 16947 | 4155 | 1040 | 441 | too low |
| Visc MV (P) dwell 340° C., 30 min. | 17253 | 4056 | 967 | 423 | too low |
| IR Stoic $NH_2$ excess, mole % | −0.60 | 0.68 | 1.77 | 2.93 | 3.33 |
| 31P NMR $NH_2$ ppm | 48 | 218 | 472 | 673 | 691 |
| Tg DSC ° C. | 218.6 | 210.1 | 200.0 | 190.6 | 187.8 |

Table 5 shows the efficacy of using octadecyl amine with a low molecule weigh PEI resin, ULTEM 1040 (control Example C) to make even lower molecular weight, higher flow resins Examples 10 to 13. With 0.3 to 1.0 wt. % octadecyl amine the MVR is increased from 12.4 to 27.8 cc/10 min. Note that in order to accommodate these very high flow resin the MVR was run at 300 vs. 337° C. The modified resins continue to show good melt stability with little change in MV after 30 minute dwell at 300 or 340° C. The IR stoichiometry shows an increase in aryl amine functionality for Examples 10 to 13. Tg is above 200° C. for all modified resins.

TABLE 5

U1040 w Octadecyl Amine

| | Example | | | | |
|---|---|---|---|---|---|
| | C | 10 | 11 | 12 | 13 |
| | | | Composition | | |
| | U1040 | 0.3% $C_{18}NH_2$ | 0.5% $C_{18}NH_2$ | 0.7% $C_{18}NH_2$ | 1.0% $C_{18}NH_2$ |
| MVR 300° C. 6 min 6.7 Kg | 9.1 | 12.4 | 15.8 | 20.3 | 27.8 |
| MVR 300° C. 18 min 6.7 Kg | 9.4 | 12.9 | 16.9 | 21.5 | 27.8 |
| Visc MV (P) dwell 300° C. start | 39203 | 29021 | 23782 | 18620 | 13160 |
| Visc MV (P) dwell 300° C., 30 min. | 39779 | 28633 | 22583 | 17197 | 11499 |
| Visc MV (P) dwell 340° C. start | 3956 | 2582 | 2067 | 1783 | 1348 |
| Visc MV (P) dwell 340° C., 30 min. | 4014 | 2586 | 2079 | 1789 | 1361 |
| GPC Mw (PS stds) | 31826 | 29745 | 30087 | 29476 | 28460 |
| GPC Mn | 14214 | 12690 | 13857 | 13213 | 12895 |
| IR Stoic $NH_2$ excess, mole % | −0.098 | 0.167 | 0.277 | 0.474 | 0.708 |
| Tg DSC ° C. | 216.9 | 212.8 | 209.0 | 207.6 | 202.7 |

In a further characterization Examples 10 to 13 were compared to control Example C in terms of their viscosity vs. shear rate (MVM) at 300° C. Table 6 shows that with higher levels of octadecyl amine the modified PEI resins show improved melt flow (lower viscosity than Example C) at a wide range of shear rates (34 to 7008 1/sec) normally encountered in melt processes such as injection molding.

TABLE 6

MVM Viscosity vs. Shear Rate for Ultem 1040 w Octadecyl Amine

| | Example | | | | |
|---|---|---|---|---|---|
| | C | 10 | 11 | 12 | 13 |
| | | | Composition | | |
| Shear Rate (1/Sec.) | U1040 PEI | 0.3% $C_{18}NH_2$ | 0.5% $C_{18}NH_2$ | 0.7% $C_{18}NH_2$ | 1.0% $C_{18}NH_2$ |
| | | Shear Viscosity (Pa-s) 300° C. | | | |
| 34 | 2910 | 2862 | 2147 | 2363 | 1828 |
| 55 | 3328 | 2620 | 2225 | 2093 | 1583 |
| 97 | 3150 | 2426 | 2025 | 1955 | 1483 |
| 202 | 2382 | 1933 | 1632 | 1583 | 1202 |
| 296 | 2053 | 1664 | 1496 | 1429 | 1117 |
| 503 | 1557 | 1287 | 1148 | 1117 | 899 |
| 645 | 1364 | 1111 | 1005 | 973 | 812 |
| 999 | 1065 | 869 | 793 | 770 | 656 |
| 1499 | 892 | 737 | 642 | 624 | 538 |
| 3008 | 645 | 533 | 474 | 457 | 397 |
| 5012 | 392 | 328 | 296 | 286 | 256 |
| 7008 | 515 | 264 | 231 | 225 | 200 |

TABLE 6-continued

MVM Viscosity vs. Shear Rate for Ultem 1040 w Octadecyl Amine

| | Example | | | | |
|---|---|---|---|---|---|
| | C | 10 | 11 | 12 | 13 |
| | | | Composition | | |
| Shear Rate (1/Sec.) | U1040 PEI | 0.3% $C_{18}NH_2$ | 0.5% $C_{18}NH_2$ | 0.7% $C_{18}NH_2$ | 1.0% $C_{18}NH_2$ |
| | | Shear Viscosity (Pa-s) 300° C. | | | |

Examples 14-19

The purpose of these Examples (Tables 7 to 10) was to evaluate aryl-amine terminated and alkyl-imide (octa decyl imide) terminated polyetherimide sulfones with improved melt flow.

The invention was further extended to the polyetherimide sulfone (PEES) resin ULTEM XH6050. Table 7 shows improved flow in Examples 14 to 16 with 0.3 to 1.5 wt. % octadecyl amine compared to the polyetherimide sulfone control Example D. MVR at 337° C. is improved from 5.2 cc/10 min, to as much as 50.9 cc/10 min. The initial melt viscosity (MV) at 340° C. for Examples 14 to 18 in the dwell test is also significantly lower than the control Example D.

The small changes in MV after 30 minutes and MVR after 18 minutes show the modified PEIS resins (14 to 18) to have good melt stability at 340° C. and indicate that any chemical modification has largely been completed after extrusion. The IR stoichiometry and 31P MNR show an increase in aryl amine content for the modified resins. Tg of the modified polyetherimide sulfone resins is at least 220° C.

and diamino diphenyl sulfone. The U1 resin was extruded at 400° C. with 0.3 wt. % octadecyl amine to prepare the improved flow modified resin of Example 19. The MVR at 400° C. is increased from 1.9 to 3.9 cc/10 min. The Tg is above 285° C.

TABLE 7

PEI XH6050 w Octadecyl Amine

| | Example | | | | | |
|---|---|---|---|---|---|---|
| | D | 14 | 15 | 16 | 17 | 18 |
| | | | Composition | | | |
| | U6050 | 0.3% $C_{18}NH_2$ | 0.5% $C_{18}NH_2$ | 0.7% $C_{18}NH_2$ | 1.0% $C_{18}NH_2$ | 1.5% $C_{18}NH_2$ |
| MVR 6 min 337° C. 6.7 Kg | 5.2 | 8.7 | 11.7 | 16.6 | 25.2 | 50.9 |
| MVR 18 min 337° C. 6.7 Kg | 5.2 | 8.7 | 11.7 | 16.6 | 25.2 | 52.5 |
| Visc MV (P) dwell 340° C. start | 46397 | 33038 | 23934 | 17758 | 11418 | 5826 |
| Visc MV (P) dwell 340° C., 30 min. | 44024 | 28344 | 20389 | 15272 | 10392 | 5212 |
| GPC Mw (PS stds) | 37639 | 33744 | 32171 | 30316 | 28530 | 25563 |
| GPC Mn | 17609 | 14175 | 13696 | 13514 | 13551 | 12049 |
| % reduction Mw | 0% | −10.3% | −14.5% | −19.5% | −24.2% | −32.1% |
| Tg DSC ° C. | 241.4 | 238.4 | 236.0 | 234.1 | 231.1 | 224.1 |
| IR Stoic $NH_2$ excess, mole % | 0.77 | 1.15 | 1.59 | 1.81 | 2.35 | 3.20 |
| 31P NMR $NH_2$ ppm | 172 | 277 | 360 | 418 | 499 | 664 |

Examples 14 to 1 were further characterized by comparing their viscosity vs. shear rate (MVM) at 350° C. to the unmodified polyetherimide sulfone (PSIS) control Example f. Table 8 shows that with higher levels of octadecyl amine the modified PEIS resins show improved melt flow (lower viscosity than Example D) at a wide range of shear rates (29 to 7016 1/sec.) that are normally encountered in melt processes such as injection molding.

TABLE 8

MVM Viscosity vs. Shear Rate U6050 PEIS

| | Example | | | | | |
|---|---|---|---|---|---|---|
| | D | 14 | 15 | 16 | 17 | 18 |
| | | | Composition | | | |
| Shear Rate (1/sec.) | U6050 | 0.3% $C_{18}NH_2$ | 0.5% $C_{18}NH_2$ | 0.7% $C_{18}NH_2$ | 1.0% $C_{18}NH_2$ | 1.5% $C_{18}NH_2$ |
| | | | Shear Viscosity (Pa-s) 350° C. | | | |
| 29 | 3428 | 2276 | 1763 | 1318 | 967 | 377 |
| 53 | 3321 | 2295 | 1753 | 1333 | 893 | 470 |
| 100 | 2931 | 2142 | 1614 | 1187 | 853 | 462 |
| 201 | 2278 | 1743 | 1315 | 1060 | 768 | 394 |
| 295 | 1998 | 1522 | 1217 | 970 | 706 | 397 |
| 501 | 1498 | 1192 | 970 | 804 | 613 | 360 |
| 643 | 1310 | 1051 | 851 | 731 | 559 | 342 |
| 1004 | 1014 | 829 | 688 | 602 | 474 | 302 |
| 1501 | 813 | 652 | 554 | 499 | 396 | 263 |
| 3006 | 577 | 454 | 377 | 342 | 277 | 194 |
| 5011 | 371 | 293 | 256 | 233 | 194 | 138 |
| 7018 | 307 | 236 | 207 | 184 | 154 | 113 |

The invention was further extended to the very high Tg U1 polyetherimide sulfone made form oxydiphthalic anhydride

TABLE 9

U1 with Octadecyl Amine

| | Example | |
|---|---|---|
| | E | 19 |
| | Composition | |
| | U1 | 0.3% $C_{18}NH_2$ |
| MVR 400° C. 6 min 6.7 Kg | 1.9 | 3.9 |
| Tg DSC ° C. | 290.9 | 285.8 |

The improved flow of the modified U1 polyetherimide sulfone resin of Example 19 is further demonstrated in comparing the viscosity vs. shear (MVM) at 400° C. to the Unmodified control Example E (Table 10). Note the lower viscosity (measured in Pa-s) at all shear rates.

TABLE 10

MVM Viscosity vs. Shear for U1 PEIS

| | Example | |
|---|---|---|
| | E | 19 |
| | Composition | |
| Shear Rate (1/sec.) | U1 | U1 + 0.3% $C_{18}NH_2$ |
| | Shear Viscosity (Pa-s) 400° C. | |
| 26 | 7809 | 3684 |
| 51 | 6316 | 3079 |
| 100 | 4885 | 2461 |
| 201 | 3738 | 1825 |
| 301 | 3023 | 1513 |
| 501 | 2299 | 1181 |
| 641 | 1949 | 1051 |
| 1002 | 1449 | 850 |

TABLE 10-continued

MVM Viscosity vs. Shear for U1 PEIS

| | Example | |
|---|---|---|
| | E | 19 |
| | Composition | |
| Shear Rate (1/sec.) | U1 | U1 + 0.3% $C_{18}NH_2$ |
| | Shear Viscosity (Pa-s) 400° C. | |
| 1504 | 1141 | 695 |
| 3007 | 740 | 478 |
| 5011 | 484 | 316 |
| 7017 | 399 | 259 |

Examples 20-23

The purpose of these Examples (Tables 11 and 12) was to evaluate aryl-amine terminated and carboxylic acid alkyl-imide terminated polyetherimides with improved melt flow.

In Examples 20 to 23 (Table 11) the U1040 resin is modified with 0.3 to 1.0% amino hexanoic acid (ANA) by melt extrusion at ~340° C. In these Examples the AHA reacts with the PEI resin to improve flow as seen by high MVR values at 300° C. and lower initial MV dwell values at 340° C. In addition there is also an increase for both the IR stoichiometry and the 31P NMR NH2 aryl amine functionality as shown by higher amine values for Examples 20 to 23 compared to the Example F control. In addition the AHA introduces a new aliphatic carboxylic acid functionality. This aliphatic COOH group gives an additional 31P NMR signal at 129.1 ppm. The Tg is above 200° C. for all the AHA modified resins. Surprisingly both the aryl amine and alkyl carboxylic acid, that might be expected to further react with each other, are both present in the modified resins.

Then MV dwell for 30 minutes at 340° C. show little change indicating little, if any, reaction even with the aryl amine and carboxylic acid groups present.

TABLE 11

U1040 w Amino Hexanoic Acid

| | Example | | | | |
|---|---|---|---|---|---|
| | F | 20 | 21 | 22 | 23 |
| | Composition | | | | |
| | U1040 | 0.3% AHA | 0.5% AHA | 0.7% AHA | 1.0% AHA |
| MVR 6 min 300° C. 6.7 Kg | 9.1 | 11.7 | 13.9 | 17.0 | 22.3 |
| MVR 18 min 300° C. 6.7 Kg | 8.7 | 11.7 | 13.7 | 16.4 | 22.7 |
| Visc MV (P) dwell 340° C. start | 4158 | 3096 | 2641 | 2401 | 1746 |
| Visc MV (P) dwell 340° C., 30 min. | 4104 | 2937 | 2552 | 2351 | 1687 |
| % MV retention | 97.7% | 94.9% | 96.6% | 97.9% | 96.6% |
| GPC Mw (PS stds) | 31994 | 30973 | 30156 | 29408 | 28274 |
| GPC Mn | 14251 | 13507 | 12642 | 13284 | 12222 |
| % reduction Mw | 0% | 3.2% | 5.7% | 8.1% | 11.6% |
| Tg DSC ° C. | 214.3 | 211.2 | 208.9 | 207.7 | 204.1 |
| IR Stoic $NH_2$ excess, mole % | −0.104 | 0.186 | 0.454 | 0.685 | 1.079 |
| 31P NMR aryl $NH_2$ ppm | 24.2 | 48.5 | 74.7 | 136.9 | 148.2 |
| 31P NMR alkyl COOH ppm | 0.0 | 80.3 | 115.4 | 255.5 | 331.2 |

Examples 20 to 23 modified with amino hexanoic acid were further characterized by comparing their viscosity vs. shear rate (MVM) at 340° C. to the polyetherimide U1040 control Example F. Table 12 shows that with higher levels of amino hexanoic acid the modified PEI resins show improved melt flow (lower viscosity than Example F) at a wide range of shear rates (26 to 7016 1/sec.) that are normally encountered in melt processes such as injection molding.

TABLE 12

MVM Visc. vs Shear U1040 w Amino Hexanoic Acid

| | Example | | | | |
|---|---|---|---|---|---|
| | F | 20 | 21 | 22 | 23 |
| | Composition | | | | |
| | U1040 | 0.3% AHA | 0.5% AHA | 0.7% AHA | 1.0% AHA |
| Shear Rate (1/sec.) | Shear Viscosity (Pa-s) 340° C. | | | | |
| 26 | 671 | 420 | 327 | 327 | 218 |
| 51 | 653 | 409 | 361 | 319 | 247 |
| 100 | 599 | 397 | 354 | 302 | 237 |
| 201 | 513 | 377 | 320 | 283 | 218 |
| 300 | 488 | 355 | 300 | 264 | 211 |
| 501 | 437 | 322 | 283 | 246 | 195 |
| 641 | 412 | 308 | 270 | 236 | 187 |
| 1003 | 357 | 267 | 243 | 216 | 174 |
| 1504 | 301 | 235 | 215 | 194 | 159 |
| 3007 | 211 | 176 | 162 | 150 | 126 |
| 5011 | 153 | 128 | 119 | 112 | 95 |
| 7016 | 124 | 106 | 98 | 93 | 81 |

Examples 24-35

The purpose of these Examples (Tables 13-17) was to evaluate aryl amine terminated silicone polyetherimide copolymers with improved melt flow.

Examples 24 to 27 show the melt reaction of 0.3 to 1.0 wt % octadecyl amine with the silicone polyetherimide copolymer SILTEM STM1700. The IR stoichiometry shows an increase in the aryl amine functionality for Examples 24 to 27 vs. the control Example G. As can be seen in comparing Example 24 to 27 to the unmodified control resin Example G the MVR at 300° C. with a 1.2 or 6.7 Kg weight are substantially increased with addition of the octadecyl amine. The initial MV at 340° C. in the dwell test also shows higher flow (a lower viscosity). The small change in MV after 30 minutes at 340° C. shows the modified silicone polyetherimide copolymers (24 to 27) to have good melt stability despite their higher amine functionality (IR Stoic $NH_2$). Tensile modulus, strength and elongation at break are retained in the high flow modified resins 24 to 27. Tg is above 190° C. The heat distortion temperature (HDT) at 66 psi is above 150° C. The resins of examples 24 to 27 retained their clarity, percent transmission (% T) is slightly increased vs. control G. The low haze (% H), below 5%, is retained and color, as shown by lower YI, is slightly improved (YI is reduced).

TABLE 13

STM1700 w Octadecyl Amine

| | Example | | | | |
|---|---|---|---|---|---|
| | G | 24 | 25 | 26 | 27 |
| | | | Composition | | |
| | STM1700 | 0.3 $C_{18}NH_2$ | 0.5 $C_{18}NH_2$ | 0.7 $C_{18}NH_2$ | 1.0 $C_{18}NH_2$ |
| IR Stoic $NH_2$ excess, mole % | 0.599 | 0.812 | 0.867 | 1.216 | 1.499 |
| GPC Mw (PS stds) | 38665 | 37217 | 36803 | 35222 | 33335 |
| GPC Mn | 13671 | 13827 | 13241 | 13090 | 12574 |
| % reduction Mw | 0% | −3.8% | −4.8% | −8.9% | −13.8% |
| MVR 300° C. 6 min 1.2 kg | 1.0 | 2.3 | 4.0 | 5.1 | 8.0 |
| MVR 300° C. 18 min 1.2 Kg | 1.0 | 1.7 | 4.8 | 5.2 | 10.3 |
| MVR 300° C. 6 min 6.7 Kg | 11.3 | 18.0 | 32.0 | 35.1 | 69.7 |
| MVR 300° C. 18 min 6.7 Kg | 11.0 | 19.1 | 37.4 | 44.2 | 83.4 |
| Visc MV (P) dwell 340° C. start | 8482 | 4823 | 3488 | 2760 | 1962 |
| Visc MV (P) dwell 340° C., 30 min. | 6791 | 3426 | 2452 | 2033 | 1458 |
| Tg DMA ° C. | 197.5 | 195.5 | 194.8 | 193.6 | 191.4 |
| HDT 66 psi ° C. | 167.4 | 160.8 | 162.2 | 160.4 | 155.6 |
| HDT 264 psi ° C. | 146.4 | 140.9 | 140.1 | 138.0 | 134.8 |
| T Mod MPa | 2230 | 2250 | 2220 | 2220 | 2160 |
| T Str (Y) MPa | 69.4 | 68.5 | 67.7 | 67.3 | 65.6 |
| % Elong (B) | 13 | 13 | 13 | 13 | 13 |
| N Izod J/m | 111 | 90 | 85 | 81 | 69 |
| RN Izod J/m | 1780 | 1530 | 1540 | 1400 | 1030 |
| MAI Total Energy (J) | 48.1 | 46.3 | 52.5 | 52.4 | 42.0 |
| YI 3.2 mm | 140.6 | 137.7 | 135.7 | 135.2 | 134.2 |
| % T | 26.6 | 30.3 | 31.9 | 32.5 | 33.3 |
| % H | 3.3 | 3.3 | 3.4 | 3.7 | 4.0 |

The improved flow of the modified silicone polyetherimide resins of Examples 24 to 27 is further demonstrated in comparing the viscosity vs. shear (MVM) at 300° C. to the unmodified control Example G (Table 14). Note the lower viscosity (measured in Pa-s) at all shear rates with octadecyl amine modification of the silicone polyetherimide copolymer.

TABLE 14

STM1700 w Octadecyl Amine MVM Visc. vs. Shear

| | Example | | | | |
|---|---|---|---|---|---|
| | G | 24 | 25 | 26 | 27 |
| | | | Composition | | |
| | STM1700 | 0.3 $C_{18}NH_2$ | 0.5 $C_{18}NH_2$ | 0.7 $C_{18}NH_2$ | 1.0 $C_{18}NH_2$ |
| Shear Rate (1/sec) | | | Shear Viscosity (Pa-s) 300° C. | | |
| 28 | 2856 | 2090 | 1612 | 1271 | 940 |
| 52 | 2351 | 1758 | 1327 | 1119 | 832 |
| 100 | 1781 | 1400 | 1091 | 889 | 659 |
| 201 | 1242 | 1008 | 781 | 656 | 497 |
| 293 | 1055 | 874 | 676 | 572 | 465 |
| 499 | 766 | 643 | 511 | 445 | 361 |
| 642 | 657 | 558 | 454 | 399 | 327 |
| 1002 | 505 | 428 | 357 | 318 | 268 |
| 1505 | 398 | 339 | 285 | 257 | 220 |
| 3006 | 259 | 224 | 185 | 177 | 153 |
| 5010 | 175 | 150 | 126 | 122 | 106 |
| 7018 | 141 | 120 | 101 | 98 | 86 |

In Table 15 Examples 28 to 31 show the melt reaction of 0.5 to 2.0 wt. % bis(3-amino propyl) terminated polydimethyl siloxane (G10) with the high Mw polyetherimide ULTEM 1000. As can be seen in comparing Examples 28 to 31 to the unmodified control resin Example H, the MVR at 337° C. is substantially increased with addition of the G10 compared to the unmodified resin of Example H. The initial MV at 340° C. in the dwell test also shows higher flow (a lower viscosity) with the added G10. The small (less than 25%) change in MV after 30 minutes at 340° C. shows the modified silicone polyetherimide copolymers (28 to 31) to have good melt stability.

Tensile modulus, strength and elongation at break are retained in the high flow modified resins 28 to 31. Tg is above 210° C. As compared to the STM Examples 24 to 28 of Table 13 the percent transmission (% T) is much lower and percent haze (% H) are much higher indicating a loss of transparency when the G10 is reacted with the U1000 PEI. Transparency was not lost in any of the previous Examples using octadecyl amine or amino hexanoic acid with the ULTEM polyetherimides or the SILTEM silicone polyetherimide.

Reversed notched Izod (RNI) and multiaxial impact (MAI) are improved in by addition of the G10 compared to the control U1000 resin of Example H. The IR stoichiometry shows that the U1000 resin, that is initially anhydride rich (IR stoic NH2, −0.079), becomes increasingly aryl amine functionalized with higher $NH_2$ stoic values.

TABLE 15

U1000 w G10 Silicone Diamine

| | Example | | | | |
|---|---|---|---|---|---|
| | H | 28 | 29 | 30 | 31 |
| | | | Composition | | |
| | U1000 | 0.5% G10 | 1.0% G10 | 1.5% G10 | 2.0% G10 |
| MVR 337° C. 6 min 6.7 Kg | 7.0 | 9.0 | 11.3 | 13.7 | 14.8 |
| MVR 337° C. 18 min 6.7 Kg | 7.2 | 9.0 | 11.5 | 13.5 | 15.2 |
| GPC Mw (PS stds) | 54425 | 52708 | 51264 | 51075 | 51203 |
| GPC Mn | 17421 | 16538 | 17034 | 18645 | 17100 |
| % change Mw vs. U1000 | | −3.2% | −5.8% | −6.2% | −5.9% |
| MV dwell 340° C. start | 35674 | 29385 | 21543 | 18727 | 17187 |
| MV dwell 340° C. 30 min | 35621 | 25754 | 18009 | 14644 | 12939 |
| % MV change | 0.0% | −12.4% | −16.4% | −21.8% | −24.7% |
| Tg DSC ° C. | 220.5 | 217.7 | 216.0 | 215.7 | 214.8 |
| HDT 264 psi ° C. | 194.9 | 194.5 | 191.9 | 192.3 | 191.0 |
| N Izod J/m | 56 | 58 | 55 | 55 | 59 |
| RN Izod J/m | 1220 | 1750 | 1480 | 1290 | 1390 |
| MAI total energy J | 6 | 11 | 24 | 17 | 13 |
| YI 3.2 mm | 80 | 123 | 144 | 150 | 160 |
| % T | 58 | 16 | 7 | 3 | 4 |
| % H | 8 | 98 | 99 | 99 | 100 |
| T Mod MPa | 3250 | 3230 | 3190 | 3170 | 3130 |
| T Str (Y) MPa | 113 | 112 | 111 | 111 | 110 |
| % Elong (B) | 13 | 15 | 14 | 12 | 15 |
| IR Stoic $NH_2$ excess, mole % | −0.079 | 0.104 | 0.372 | 0.468 | 0.562 |

The improved flow of the G10 amine functional polyetherimide resins of Examples 28 to 31 is further demonstrated in comparing the viscosity vs. shear (MVM) at 340° C. to the unmodified control Example H (Table 15). Note the lower viscosity (measured in Pa-s) at all shear rates with G10 silicone diamine modification.

TABLE 15

U1000 w G10 Silicone Diamine MVM Visc. vs. Shear

| | Example | | | | |
|---|---|---|---|---|---|
| | H | 28 | 29 | 30 | 31 |
| | | | Composition | | |
| Shear Rate (1/sec.) | U1010 | 0.5% G10 | 1.0% G10 | 1.5% G10 | 2.0% G10 |
| | | Shear Viscosity (Pa-s) 340° C. | | | |
| 26 | 2310 | 1997 | 1929 | 1425 | 1242 |
| 51 | 2038 | 1817 | 1651 | 1363 | 1251 |
| 100 | 1822 | 1585 | 1393 | 1200 | 1018 |
| 200 | 1495 | 1315 | 1169 | 961 | 790 |
| 300 | 1303 | 1147 | 1018 | 834 | 670 |
| 501 | 1056 | 936 | 839 | 691 | 581 |
| 642 | 935 | 827 | 756 | 632 | 532 |
| 1002 | 739 | 655 | 612 | 530 | 452 |
| 1504 | 587 | 520 | 491 | 437 | 388 |
| 3007 | 396 | 345 | 330 | 300 | 279 |
| 5011 | 269 | 233 | 226 | 207 | 197 |
| 7016 | 209 | 181 | 180 | 165 | 157 |

In Table 16 Examples 32 to 35 show the melt reaction of 0.5 to 2.0 wt. % bis(3-amino propyl) terminated polydimethyl siloxane (G10) with polyetherimide ULTEM 1010. As can be seen in comparing Examples 22 to 35 to the unmodified control resin Example I the MVR at 337° C. is substantially increased with addition of the G10 compared to the unmodified resin of Example I. The initial MV (MV Dwell start) at 340° C. in the dwell test also shows higher flow (a lower viscosity) with the added G10.

Tensile modulus, strength and elongation at break are largely retained in the high flow modified resins 32 to 35. Tg is above 215° C. Reversed notched Izod (RNI) and multiaxial impact (MAI) are improved in Examples 32 and 33 by addition of the 0.5 and 1.0 wt. % G10 compared to the control Example I.

The IR stoichiometry shows that the U1000 resin that is initially anhydride rich (IR stoic $NH_2$, −0.06) becomes increasingly aryl amine functionalized with higher $NH_2$ stoic values. 31P NMR also shows an increase in aryl amine functionality from 45 to 156 ppm.

TABLE 16

U1010 w G10 Silicone Diamine

| | Example | | | | |
|---|---|---|---|---|---|
| | I | 32 | 33 | 34 | 35 |
| | | | Composition | | |
| | U1010 | 0.5% G10 | 1.0% G10 | 1.5% G10 | 2.0% G10 |
| MVR 337° C. 6 min 6.7 Kg | 17.5 | 20.8 | 22.1 | 28.3 | 30.5 |
| MVR 337° C. 18 min 6.7 kg | 18.7 | 19.9 | 24.2 | 27.9 | 32.6 |
| GPC Mw (PS stds) | 43899 | 43240 | 42366 | 41724 | 41783 |
| GPC Mn | 18311 | 18637 | 18161 | 17187 | 18960 |
| % change Mw vs U1010 | 0% | −1.5% | −3.5% | −5.0% | −4.8% |
| MV dwell 340° C. start | 14927 | 12741 | 11187 | 9877 | 7832 |
| MV dwell 340° C., 30 min | 15152 | 11678 | 9747 | 8310 | 6179 |
| Tg DSC ° C. | 219.0 | 216.8 | 216.1 | 216.1 | 215.4 |
| N Izod J/m | 54 | 56 | 57 | 56 | 57 |
| RN Izod J/m | 1180 | 1510 | 1300 | 1080 | 958 |
| T Mod MPa | 3860 | 3770 | 3830 | 3800 | 3760 |
| T Str (Y) MPa | 114 | 113 | 111 | 111 | 111 |
| % Elong (B) | 47 | 48 | 28 | 13 | 14 |
| Stoic $NH_2$ excess IR mole % | −0.06 | 0.04 | 0.28 | 0.36 | 0.59 |
| 31P NMR $NH_2$ ppm | 45 | 66 | 109 | 114 | 156 |

In Table 17 the improved flow of the G10 modified U1010 polyetherimide resins of Examples 32 to 35 is further demonstrated in comparing the viscosity vs. shear (MVM) at 340° C. to the unmodified control Example I. Note the lower viscosity (measured in Pa-s) at all shear rates with G10 silicone diamine modification.

TABLE 17

U1010 w G10 Silicone Diamine MVM Visc. vs. Shear

| | Example | | | | |
|---|---|---|---|---|---|
| | I | 32 | 33 | 34 | 35 |
| | | | Composition | | |
| Shear Rate (1/sec.) | U1010 | 0.5% G10 | 1.0% G10 | 1.5% G10 | 2.0% G10 |
| | | Shear Viscosity (Pa-s) 340° C. | | | |
| 26 | 2310 | 1997 | 1929 | 1425 | 1242 |
| 51 | 2038 | 1817 | 1651 | 1363 | 1251 |
| 100 | 1822 | 1585 | 1393 | 1200 | 1018 |
| 200 | 1495 | 1315 | 1169 | 961 | 790 |
| 300 | 1303 | 1147 | 1018 | 834 | 670 |
| 501 | 1056 | 936 | 839 | 691 | 581 |
| 642 | 935 | 827 | 756 | 632 | 532 |
| 1002 | 739 | 655 | 612 | 530 | 452 |
| 1504 | 587 | 520 | 491 | 437 | 388 |
| 3007 | 396 | 345 | 330 | 300 | 279 |
| 5011 | 269 | 233 | 226 | 207 | 197 |
| 7016 | 209 | 181 | 180 | 165 | 157 |

Fiber Examples 36-37

Our aryl-amine terminated and alkyl-imide terminated PEI resin modified with 0.7 wt. % octadecyl amine of Example 4 was melt spun into very fine fibers having a denier that was more than 0 and less than 10, i.e., 2 and 6 denier. The resin was dried for at least 4 hr at about 150° C. and extruded into fibers using a single screw 24:1 L/D extruder set at 360 to 395° C. with a 325 mesh (40-50 micron) screen pack, which fed a melt pump run at about 12 rpm feeding a 0.6 mm 144 filament die. The denier, feed and draw roils were run at about 100° F. and 1500 rpm. The spool, pump dam and wear plate temperatures were about 400° F. After extrusion the fibers were coated (finished) with a lubricant and fiber process aid, LUROL F6164G from Goulston Technologies Inc., and wound on to a bobbin. In Examples 36 and 37 fibers were made with a 2 and 6 denier/filament (dpf) value. Throughput was about 0.33 to 1.0 grams/hole/minute. The modified resin spun well with no breakage or dropped fibers. The fibers were smooth and had good lustrous appearance. Properties of these fibers are shown in Table 18 Tenacity as measured as per ASTM D2256, was greater than 1.5 grams/fiber (g/f). Shrinkage, as measured as per ASTM D2259, at 180° C. was less than 1%, 200° C. shrinkage was less than 3%. The 2 dpf fiber (Example 37) had a tensile strength at max load, as measured as per ASTM D2256 of over 75 MPa.

TABLE 18

Fiber Examples

| | U1010 w 0.7 wt % $C_{18}NH_2$ (resin of Example 4) | max load (gf) | Tenacity g/f | Tensile Strain @ max load MPa | % shrinkage 180° C. | % shrinkage 200° C. |
|---|---|---|---|---|---|---|
| Example 36 | 6 dpf fiber | 1334 | 1.6 | 114.5 | 0.5 | 1.9 |
| Example 37 | 2 dpf fiber | 480 | 1.7 | 76.2 | 0.6 | 3.6 |

Example 38

The purpose of this Example was to make a fabric from a polyetherimide having aryl-amine functionality. The fiber of Example 37 was knitted into a 3-inch diameter sock. The resulting sock was tested for oxygen index (OI) as per ASTM D2863. The OI of the sample was 31%, showing a fabric that was very resistant to combustion.

Example 39

Comparative

The purpose of this Example was to evaluate the limits of making fibers from a PEI that was not aryl-amine terminated and alkyl-imide terminated PEI. The octadecyl amine modified PEI resin had a much wider processing window than the more viscous ULTEM 1010 resin. Melt pressure for the 0.7% octadecyl amine modified PEI (Example 4) was 700 psi compared to the U1010 control (Example A) which had a 1300 psi melt pressure under the same extrusion conditions. The octadecyl amine modified resin could also be melt spun at 25 to 50° C. lower temperature than the U1010 control.

The U1010 control (Example A) sample showed fiber breakage after spinning at 2 denier after only 4 hours, in other instances fiber breakage occurred after only 2 hrs spinning. The high flow aryl amine and alkyl (octadecyl) imide terminated resin (Example 4) gave no fiber breakage after 8 hrs. (Table 19). Note that the time to fiber breakage may have been longer but the experiment was terminated at 8 hrs. The pressure during fiber spinning from the melt was about 47% lower with the amine and octadecyl imide terminated resin of example 4 compared to the U1010 control (Example A).

TABLE 19

| Fiber Spinning | | |
|---|---|---|
| | Average time to fiber breakage during 2 denier spinning | Pressure (psi) |
| U1010 (resin of example A) | 3 hrs | 1300 |
| U1010 w 0.7 wt % C18NH2 (resin of example 4) | >8 hrs | 700 |

Although the present invention has been described in considerable detail with reference to certain preferred versions thereof, other versions are possible. Therefore, the spirit and scope of the appended claims should not be limited to the description of the preferred versions contained herein.

The reader's attention is directed to all papers and documents which are filed concurrently with this specification and which are open to public inspection with this specification, and the contents of all such papers and documents are incorporated herein by reference.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Any element in a claim that does not explicitly state "means for" performing a specified function, or "step for" performing a specific function, is not to be interpreted as a "means" or "step" clause as specified in 35 U.S.C §112, sixth paragraph. In particular, the use of "step of" in the claims herein is not intended to invoke the provisions of 35 U.S.C §112, sixth paragraph.

What is claimed is:

1. A process comprising reaction blending a polyimide resin and an organic compound to produce an aryl amine functionalized polyimide having aryl amine functionality in excess of any anhydride functionality, the process comprising:

melt blending an aryl polyimide resin and an organic compound under reaction conditions to form a reaction product comprising an aryl amine functionalized polyimide having aryl amine functionality in excess of any anhydride functionality;

wherein the aryl polyimide resin has a weight average molecular weight (Mw) from 5,000 to 100,000 Daltons and an inherent viscosity of 0.35 to 1.0 dl/g as measured in m-cresol at 25° C.;

wherein the organic compound comprises at least one primary aliphatic amine, wherein the primary aliphatic amine does not have a direct linkage of a nitrogen to an aryl group, and wherein the primary aliphatic amine does not have a functionality selected from the group consisting of a halogen functionality, a hydroxyl functionality, a sulfonic acid functionality, a sulfonic acid salt functionality, and combinations thereof;

wherein the aryl amine functionalized polyimide has an aryl amine content of from 0.3 to 3.0 mole percent of the aryl amine functionalized polyimide; and, recovering the aryl amine functionalized polyimide.

2. The process of claim 1, wherein the blending occurs in an extruder operated at atmospheric pressure with no vacuum applied.

3. The process of claim 1, wherein the blending occurs in an extruder operated at 50 to 500 rpm.

4. The process of claim 1, wherein the blending occurs at a temperature of from 200 to 400 degrees Celsius.

5. The process of claim 1, wherein the blending of the polyimide resin and the organic compound occurs in the presence of less than 500 ppm of an organic solvent.

6. The process of claim 1, wherein the polyimide resin is selected from the group consisting of a polyetherimide, a silicone polyetherimide, a polyetherimide sulfone resin, and combinations thereof.

7. The process of claim 1, wherein the polyimide resin is a silicone polyetherimide comprising from 1 to 40 weight percent of a dimethyl silicone.

8. The process of claim 1, wherein the polyimide resin is a silicone polyetherimide comprising from 5 to 40 weight percent of a dimethyl silicone having a silicone block length of 5 to 50 repeat units.

9. The process of claim 1, wherein the polyimide resin has a glass transition temperature (Tg) greater than 200 degrees Celsius.

10. The process of claim 1, wherein the polyimide resin is substantially free of benzylic protons.

11. The process of claim 1, wherein the polyimide resin is substantially free of halogen atoms.

12. The process of claim 1, wherein the organic compound comprises from 0.1 to 10.0 weight percent of a $C_6$ to $C_{36}$ primary aliphatic amine.

13. The process of claim 1, wherein the organic compound comprises from 0.1-5.0 weight percent of a $C_6$ to $C_{36}$ primary aliphatic amine.

14. The process of claim 1, wherein the organic compound is a primary aliphatic amine further comprising a carboxylic acid functionality.

15. The process of claim 1, wherein the aryl amine functionalized polyimide has melt viscosity as measured by ASTM4440 at 340 degrees Celsius that is at least 15% lower than the polyimide resin.

16. The process of claim 1, wherein the aryl amine functionalized polyimide has a melt flow index as measured by ASTM D1238 with a 6.7 Kg weight at 337 degrees Celsius of from 5.0 to 100.0 cc/10 min.

17. The process of claim 1, wherein the aryl amine functionalized polyimide has a glass transition temperature (Tg) greater than 180 degrees Celsius.

18. The process of claim 1, wherein the resultant reaction blended aryl amine functionalized polyimide is end capped with a $C_6$ to $C_{36}$ alkyl imide functionality.

19. The process of claim 1, wherein the reaction blended aryl amine functionalized polyimide has an aryl amine content of from 0.15 to 3.0 mole percent of the aryl amine functionalized polyimide.

20. The process of claim 1, wherein the reaction blended aryl amine functionalized polyimide has an aryl amine content of from 0.3 to 1.5 mole percent of the aryl amine functionalized polyimide.

21. The process of claim 1, further comprising continuously producing a fiber from the recovered aryl amine functionalized polyimide, by melt forming said fiber having a denier in a range of from greater than 0 to 10 denier at a rate of from 0.5 to 10 kg/hour.

* * * * *